US012562814B2

(12) United States Patent　　　(10) Patent No.:　US 12,562,814 B2
Dallal et al.　　　　　　　　　　　(45) Date of Patent:　　Feb. 24, 2026

(54) FULL DUPLEX OPTICAL COMMUNICATIONS WITH MODULATED RETRO REFLECTOR

(71) Applicant: QUALCOMM Incorporated, San Diego, CA (US)

(72) Inventors: Yehonatan Dallal, Kfar Saba (IL); Shay Landis, Hod Hasharon (IL); Idan Michael Horn, Hod Hasharon (IL); Amit Bar-Or Tillinger, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 409 days.

(21) Appl. No.: 18/156,758

(22) Filed: Jan. 19, 2023

(65) Prior Publication Data

US 2024/0250754 A1　　　Jul. 25, 2024

(51) Int. Cl.
　　*H04B 10/293*　　　(2013.01)
　　*H04B 10/112*　　　(2013.01)
　　*H04B 10/516*　　　(2013.01)
(52) U.S. Cl.
　　CPC ..... *H04B 10/2939* (2013.01); *H04B 10/1129* (2013.01); *H04B 10/5161* (2013.01)
(58) Field of Classification Search
　　CPC ............ H04B 10/2939; H04B 10/1129; H04B 10/5161
　　See application file for complete search history.

(56) References Cited

U.S. PATENT DOCUMENTS

| | | | | |
|---|---|---|---|---|
| 5,121,242 A | * | 6/1992 | Kennedy ............ | H04B 10/2587 398/128 |
| 2008/0187314 A1 | * | 8/2008 | Chung ................. | H04J 14/025 398/72 |
| 2022/0159472 A1 | * | 5/2022 | Vivanco .............. | H04W 28/085 |
| 2023/0327776 A1 | * | 10/2023 | Van Veen ........... | H04B 10/5161 398/183 |

FOREIGN PATENT DOCUMENTS

| | | | | | |
|---|---|---|---|---|---|
| CN | 105445234 B | * | 7/2019 | ......... | G01N 15/0205 |
| CN | 114978353 A | * | 8/2022 | ........... | H04B 10/516 |

* cited by examiner

*Primary Examiner* — Leslie C Pascal
(74) *Attorney, Agent, or Firm* — Holland & Hart LLP

(57)　　　　　ABSTRACT

Methods, systems, and devices for wireless communications are described. Techniques described herein provide for a user equipment (UE) with a Modulated Retro Reflector (MRR) to support full duplex Optical Wireless Communications. To achieve full duplex communication, the UE and a network entity may use compatible modulation schemes for downlink communications and uplink communications. The UE and network entity may negotiate and agree upon compatible the uplink and downlink modulation schemes. The UE may receive a downlink OWC transmission using the downlink modulation scheme and transmit an uplink OWC transmission via modulating the downlink transmission in accordance with the uplink modulation scheme.

30 Claims, 16 Drawing Sheets

605 — Control signaling indicating a first modulation scheme and a second modulation scheme 610 — Downlink transmission modulated in accordance with the first modulation scheme Uplink transmission based at least in part on modulating the downlink transmission in accordance with the second modulation scheme

615

600

710

720

715

705

700

1110

1120

1115

1105

1100

130    105    115

Network
Entity

Transceiver

1410

Antenna

1415

Communications
Manager

1420

Memory

Code

1430

1425

1440

Processor

1435

1405

1400

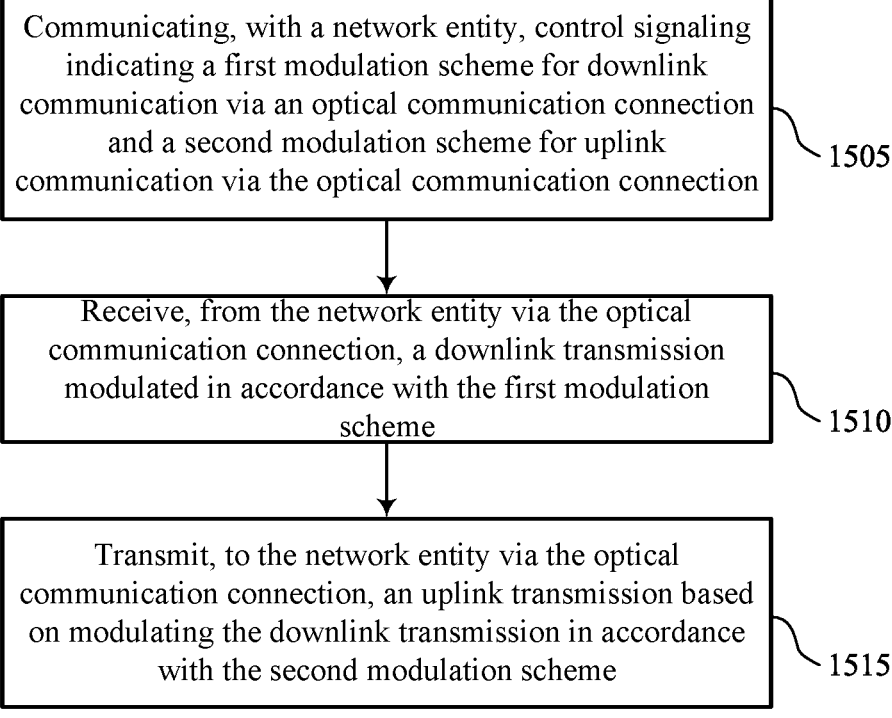

Communicating, with a network entity, control signaling indicating a first modulation scheme for downlink communication via an optical communication connection and a second modulation scheme for uplink communication via the optical communication connection

1505

Receive, from the network entity via the optical communication connection, a downlink transmission modulated in accordance with the first modulation scheme

1510

Transmit, to the network entity via the optical communication connection, an uplink transmission based on modulating the downlink transmission in accordance with the second modulation scheme

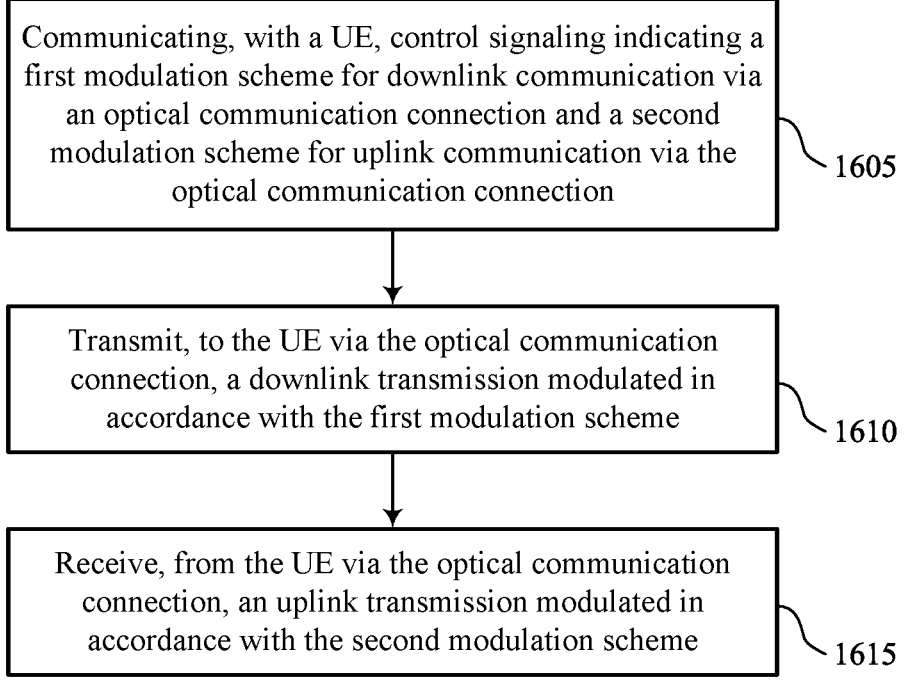

Communicating, with a UE, control signaling indicating a first modulation scheme for downlink communication via an optical communication connection and a second modulation scheme for uplink communication via the optical communication connection

1605

Transmit, to the UE via the optical communication connection, a downlink transmission modulated in accordance with the first modulation scheme

1610

Receive, from the UE via the optical communication connection, an uplink transmission modulated in accordance with the second modulation scheme

FULL DUPLEX OPTICAL COMMUNICATIONS WITH MODULATED RETRO REFLECTOR

FIELD OF TECHNOLOGY

The following relates to wireless communications, including full duplex optical communications with modulated retro reflector.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support full duplex optical communications with modulated retro reflector (MRR). For example, the described techniques provide for a user equipment (UE) with the MRR to support full duplex Optical Wireless Communications. To achieve full duplex communication, the UE and a network entity may use compatible modulation schemes for downlink communications and uplink communications. The UE and network entity may negotiate and agree on compatible the uplink and downlink modulation schemes.

A method for wireless communications at a user equipment (UE) is described. The method may include communicating, with a network entity, control signaling indicating a first modulation scheme for downlink communication via an optical communication connection and a second modulation scheme for uplink communication via the optical communication connection, receiving, from the network entity via the optical communication connection, a downlink transmission modulated in accordance with the first modulation scheme, and transmitting, to the network entity via the optical communication connection, an uplink transmission based on modulating the downlink transmission in accordance with the second modulation scheme.

An apparatus for wireless communications at a UE is described. The apparatus may include a processor, memory coupled with the processor, and instructions stored in the memory. The instructions may be executable by the processor to cause the apparatus to communicating, with a network entity, control signal indicating a first modulation scheme for downlink communication via an optical communication connection and a second modulation scheme for uplink communication via the optical communication connection, receive, from the network entity via the optical communication connection, a downlink transmission modulated in accordance with the first modulation scheme, and transmit, to the network entity via the optical communication connection, an uplink transmission based on modulating the downlink transmission in accordance with the second modulation scheme.

Another apparatus for wireless communications at a UE is described. The apparatus may include means for communicating, with a network entity, control signaling indicating a first modulation scheme for downlink communication via an optical communication connection and a second modulation scheme for uplink communication via the optical communication connection, means for receiving, from the network entity via the optical communication connection, a downlink transmission modulated in accordance with the first modulation scheme, and means for transmitting, to the network entity via the optical communication connection, an uplink transmission based on modulating the downlink transmission in accordance with the second modulation scheme.

A non-transitory computer-readable medium storing code for wireless communications at a UE is described. The code may include instructions executable by a processor to communicating, with a network entity, control signal indicating a first modulation scheme for downlink communication via an optical communication connection and a second modulation scheme for uplink communication via the optical communication connection, receive, from the network entity via the optical communication connection, a downlink transmission modulated in accordance with the first modulation scheme, and transmit, to the network entity via the optical communication connection, an uplink transmission based on modulating the downlink transmission in accordance with the second modulation scheme.

Some examples of the method, apparatuses, and non-transitory computer-readable medium described herein may further include operations, features, means, or instructions for transmitting, to the network entity, an indication of a capability of the UE to support the optical communication connection via modulated retro reflection, where the control signaling may be received based on the indication.

Some examples of the method, apparatuses, and non-transitory computer-readable medium described herein may further include operations, features, means, or instructions for transmitting, to the network entity, a capability indication that indicates the UE includes a laser and receiving, from the network entity, control signaling configuring the UE to use the laser for uplink communication via the optical communication connection based on a distance between the UE and the network entity.

Some examples of the method, apparatuses, and non-transitory computer-readable medium described herein may further include operations, features, means, or instructions for transmitting, to the network entity, an indication of a capability of the UE to support full duplex communications via the optical communication connection, where the control signaling may be received based on the indication.

In some examples of the method, apparatuses, and non-transitory computer-readable medium described herein, communicating the control signaling may include operations, features, means, or instructions for communicating one or more control messages to negotiate the first modulation scheme and the second modulation scheme.

In some examples of the method, apparatuses, and non-transitory computer-readable medium described herein, communicating the one or more control messages may include operations, features, means, or instructions for receiving, from the network entity, a first control message indicating the first modulation scheme.

In some examples of the method, apparatuses, and non-transitory computer-readable medium described herein, communicating the one or more control messages may include operations, features, means, or instructions for trans-mitting, to the network entity, a second control message indicating the second modulation scheme from a set of modulation schemes compatible with the first modulation scheme.

In some examples of the method, apparatuses, and non-transitory computer-readable medium described herein, communicating the one or more control messages to nego-tiate may include operations, features, means, or instructions for receiving, from the network entity, a second control message indicating the second modulation scheme.

In some examples of the method, apparatuses, and non-transitory computer-readable medium described herein, the downlink transmission may be modulated via modulated retro reflection.

In some examples of the method, apparatuses, and non-transitory computer-readable medium described herein, the optical communication connection includes a full duplex communication connection.

In some examples of the method, apparatuses, and non-transitory computer-readable medium described herein, the first modulation scheme may be a first on-off-keying non-return-to-zero modulation at a first rate and the second modulation scheme may be a second on-off-keying non-return-to-zero modulation at a second rate lower than the first rate.

In some examples of the method, apparatuses, and non-transitory computer-readable medium described herein, the first modulation scheme may be a return-to-zero Manchester modulation at a first rate and the second modulation scheme may be one of on-off-keying non-return-to-zero modulation at the first rate, a pulse amplitude modulation, or a quadra-ture amplitude modulation.

In some examples of the method, apparatuses, and non-transitory computer-readable medium described herein, the first modulation scheme may be an amplitude modulation scheme and the second modulation scheme may be a phase modulation scheme.

In some examples of the method, apparatuses, and non-transitory computer-readable medium described herein, for the first modulation scheme, each bit value may be repre-sented by a positive transmission power level.

In some examples of the method, apparatuses, and non-transitory computer-readable medium described herein, the first modulation scheme may be an multi-level pulse ampli-tude modulation scheme.

A method for wireless communications at a network entity is described. The method may include communicat-ing, with a UE, control signaling indicating a first modula-tion scheme for downlink communication via an optical communication connection and a second modulation scheme for uplink communication via the optical commu-nication connection, transmitting, to the UE via the optical communication connection, a downlink transmission modu-lated in accordance with the first modulation scheme, and receiving, from the UE via the optical communication connection, an uplink transmission modulated in accordance with the second modulation scheme.

An apparatus for wireless communications at a network entity is described. The apparatus may include a processor, memory coupled with the processor, and instructions stored in the memory. The instructions may be executable by the processor to cause the apparatus to communicating, with a UE, control signal indicating a first modulation scheme for downlink communication via an optical communication connection and a second modulation scheme for uplink communication via the optical communication connection, transmit, to the UE via the optical communication connec-tion, a downlink transmission modulated in accordance with the first modulation scheme, and receive, from the UE via the optical communication connection, an uplink transmis-sion modulated in accordance with the second modulation scheme.

Another apparatus for wireless communications at a net-work entity is described. The apparatus may include means for communicating, with a UE, control signaling indicating a first modulation scheme for downlink communication via an optical communication connection and a second modu-lation scheme for uplink communication via the optical communication connection, means for transmitting, to the UE via the optical communication connection, a downlink transmission modulated in accordance with the first modu-lation scheme, and means for receiving, from the UE via the optical communication connection, an uplink transmission modulated in accordance with the second modulation scheme.

A non-transitory computer-readable medium storing code for wireless communications at a network entity is described. The code may include instructions executable by a processor to communicating, with a UE, control signal indicating a first modulation scheme for downlink commu-nication via an optical communication connection and a second modulation scheme for uplink communication via the optical communication connection, transmit, to the UE via the optical communication connection, a downlink trans-mission modulated in accordance with the first modulation scheme, and receive, from the UE via the optical commu-nication connection, an uplink transmission modulated in accordance with the second modulation scheme.

Some examples of the method, apparatuses, and non-transitory computer-readable medium described herein may further include operations, features, means, or instructions for receiving, from the UE, an indication of a capability of the UE to support the optical communication connection via modulated retro reflection, where the control signaling may be transmitted based on the indication.

Some examples of the method, apparatuses, and non-transitory computer-readable medium described herein may further include operations, features, means, or instructions for receiving, from the UE, a capability indication that indicates the UE includes a laser and transmitting, to the UE, control signaling configuring the UE to use the laser for uplink communication via the optical communication con-nection based on a distance between the UE and the network entity.

In some examples of the method, apparatuses, and non-transitory computer-readable medium described herein, the optical communication connection includes a full duplex communication connection.

Some examples of the method, apparatuses, and non-transitory computer-readable medium described herein may further include operations, features, means, or instructions for receiving, from the UE, an indication of a capability of the UE to support full duplex communications via the optical communication connection, where the control sig-naling may be transmitted based on the indication.

In some examples of the method, apparatuses, and non-transitory computer-readable medium described herein, communicating the control signaling may include operations, features, means, or instructions for communicating one or more control messages to negotiate the first modulation scheme and the second modulation scheme.

In some examples of the method, apparatuses, and non-transitory computer-readable medium described herein, communicating the one or more control messages to negotiate may include operations, features, means, or instructions for transmitting, to the UE, a first control message indicating the first modulation scheme.

In some examples of the method, apparatuses, and non-transitory computer-readable medium described herein, communicating the one or more control messages to negotiate may include operations, features, means, or instructions for transmitting, to the UE, a second control message indicating the second modulation scheme.

In some examples of the method, apparatuses, and non-transitory computer-readable medium described herein, communicating the one or more control messages to negotiate may include operations, features, means, or instructions for receiving, from the UE, a second control message indicating the second modulation scheme from a set of modulation schemes compatible with the first modulation scheme.

In some examples of the method, apparatuses, and non-transitory computer-readable medium described herein, the first modulation scheme may be a first on-off-keying non-return-to-zero modulation at a first rate and the second modulation scheme may be a second on-off-keying non-return-to-zero modulation at a second rate lower than the first rate.

In some examples of the method, apparatuses, and non-transitory computer-readable medium described herein, the first modulation scheme may be a return-to-zero Manchester modulation at a first rate and the second modulation scheme may be one of on-off-keying non-return-to-zero modulation at the first rate, a pule amplitude modulation, or a quadrature amplitude modulation.

In some examples of the method, apparatuses, and non-transitory computer-readable medium described herein, the first modulation scheme may be an amplitude modulation scheme and the second modulation scheme may be a phase modulation scheme.

In some examples of the method, apparatuses, and non-transitory computer-readable medium described herein, for the first modulation scheme, each bit value may be represented by a positive transmission power level.

In some examples of the method, apparatuses, and non-transitory computer-readable medium described herein, the first modulation scheme may be an multi-level pulse amplitude modulation scheme.

BRIEF DESCRIPTION OF THE DRAWINGS

FIGS. 15 and 16 illustrate flowcharts showing methods that support full duplex optical communications with MRR in accordance with one or more aspects of the present disclosure.

DETAILED DESCRIPTION

Figure 1:
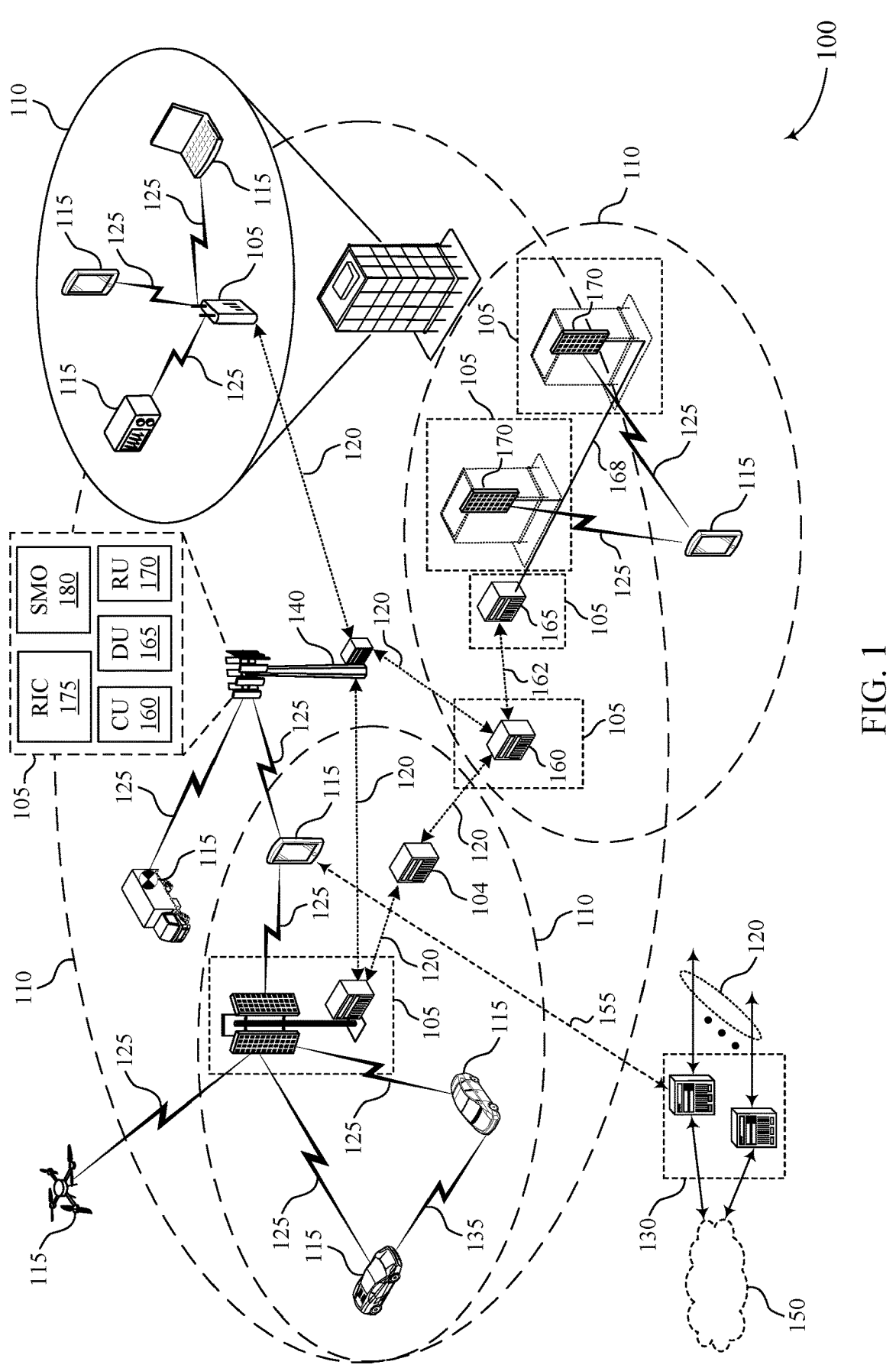
FIG. 1 illustrates an example of a wireless communications system that supports full duplex optical communications with modulated retro reflector (MRR) in accordance with one or more aspects of the present disclosure.

Laser based Optical Wireless Communications (OWC) may be considered as part of next generation wireless communications systems, such as sixth generation (6G). OWC may support user equipments (UE), such as extended reality (XR) devices, that communicate with a network entity using optical beams. A modulated retro reflector (MRR) is a device capable of modulating an incoming laser beam at high bandwidth and reflecting it back to the transmitter. The MRR may modulate an incoming beam using a controllable absorber, a phase shifter, or both. Introducing the MRR to the UE may enable OWC without using a laser at the UE. A UE with the MRR may be capable of supporting full duplex communication. To achieve full duplex OWC using an MRR, however, the UE and network entity may use compatible modulation schemes for downlink communications and uplink communications.

The UE and the network entity may communicate control signaling indicating a downlink modulation scheme for an optical connection and a compatible uplink modulation scheme. The UE may accordingly receive a downlink OWC transmission using the downlink modulation scheme and transmit an uplink OWC transmission via modulating (e.g., via the MRR) the downlink transmission in accordance with the uplink modulation scheme. Accordingly, the UE and the network entity may achieve high throughput and low latency associated with full duplex OWC using an MRR at the UE (e.g., without an active laser at the UE). Achieving full duplex OWC without an active laser at the UE may reduce manufacturing costs and power consumption of the UE.

For example, the uplink modulation scheme may use a different rate than the downlink modulation scheme. As another example, the uplink modulation scheme may use phase modulation while the downlink modulation scheme may use amplitude modulation. As another example, the downlink modulation scheme may be a Manchester scheme while the uplink modulation scheme may be an on-off keying (OOK), pulse amplitude modulation (PAM) scheme, or quadrature amplitude modulation (QAM) scheme. As another example, the downlink modulation may not be full power (e.g., zero values are represented by a non-zero transmission power level), such that there is a non-zero downlink transmission power level to modulate and reflect. Using such compatible uplink and downlink modulation schemes enables the UE and the network entity to achieve full duplex OWC using an MRR at the UE (e.g., without an active laser at the UE).

In some cases, the UE may indicate to the network entity a capability of the UE to support OWC via an MRR and/or to support full duplex OWC via the MRR. The UE and the network entity may negotiate the uplink and downlink modulation schemes based on the indication that the UE supports OWC via the MRR. In some examples, the network entity may indicate a downlink modulation scheme, and the UE may select a compatible uplink modulation scheme based on the indicated downlink modulation scheme. In some examples, the network entity may indicate the down-link and uplink modulation schemes.

Aspects of the disclosure are initially described in the context of wireless communications systems. Additional aspects of the disclosure are described in the context of examples of the MRR, an example wireless communications systems, example waveforms, and an example process flow. Aspects of the disclosure are further illustrated by and described with reference to apparatus diagrams, system diagrams, and flowcharts that relate to full duplex optical communications with MRR.

FIG. 1 illustrates an example of a wireless communications system 100 that supports full duplex optical communications with MRR in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be config-ured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communi-cate with the core network 130, or with one another, or both. For example, network entities 105 may communicate with the core network 130 via one or more backhaul communi-cation links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communica-tion link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul com-munication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support full duplex optical communications with MRR as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Laser based OWC may be considered as part of next generation wireless communications systems, such as 6G. OWC may support UEs 115, such as XR devices, that communicate with the network entity 105 using optical beams. An MRR is a device capable of modulating an incoming laser beam at high bandwidth and reflecting it back. The MRR may modulate an incoming beam using a controllable absorber, a phase shifter, or both. Introducing the MRR to the UE 115 may enable OWC without using a laser at the UE 115. The UE 115 with the MRR may be capable of supporting full duplex communication. To achieve full duplex communication, the UE 115 and network entity 105 may use compatible modulation schemes for downlink communications and uplink communications.

The UE 115 and the network entity 105 may negotiate and agree upon compatible uplink and downlink modulation schemes for full duplex OWC using the MRR at the UE 115 to transmit uplink communications. For example, the uplink modulation scheme may use a different rate than the downlink modulation scheme. As another example, the uplink modulation scheme may use phase modulation while the downlink modulation scheme may use amplitude modulation. As another example, the downlink modulation scheme may be a Manchester scheme while the uplink modulation scheme may be an OOK, PAM scheme, or QAM scheme. As another example, the downlink modulation may not be full power (e.g., zero values are represented by a non-zero transmission power level), such that there is a non-zero downlink transmission power level to modulate and reflect.

In some cases, the UE 115 may indicate, to the network entity 105, a capability of the UE 115 to support OWC via an MRR or a laser and/or to support full duplex OWC via the MRR or the laser. The UE 115 and the network entity 105 may negotiate the uplink and downlink modulation schemes based on the indication that the UE 115 supports OWC via the MRR. In some examples, the network entity 105 may indicate a downlink modulation scheme, and the UE 115 may select a compatible uplink modulation scheme based on the indicated downlink modulation scheme. In some examples, the network entity 105 may indicate the downlink and uplink modulation schemes.

Figure 2:
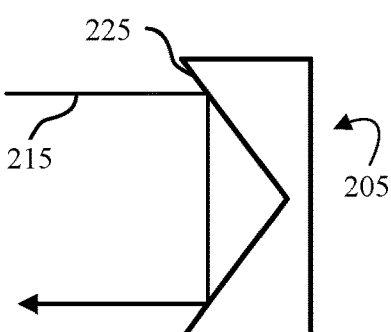
FIG. 2 illustrates examples of an MRR that supports full duplex optical communications with MRR in accordance with one or more aspects of the present disclosure.
Figure 2:
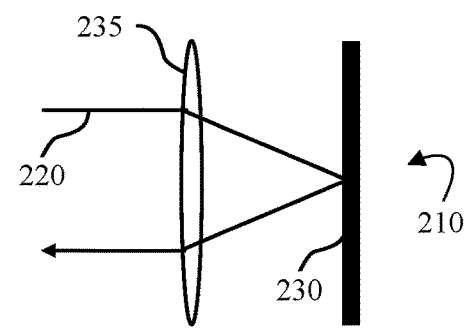
Figure 2:
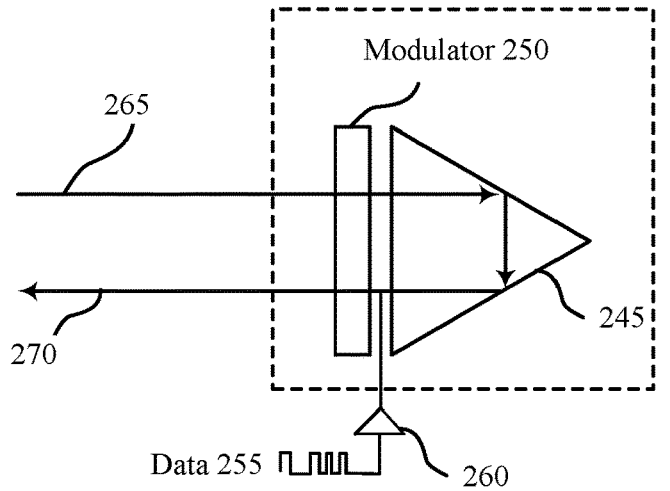
Figure 2:
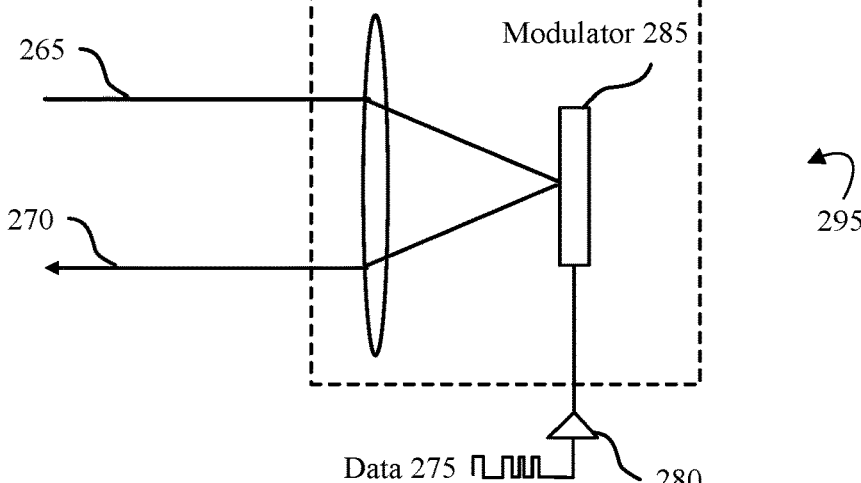
Figure 2:

FIG. 2 illustrates examples of an MRR 200 that supports full duplex optical communications with MRR in accordance with one or more aspects of the present disclosure. In some examples, the MRR 200 may implement aspects of the wireless communication system 100.

An MRR is a device capable of modulating an incoming laser beam at high bandwidth and reflecting the laser beam back at the same angle from which it arrived. Two example configurations to perform retroreflection are a corner cube configuration 205 and a cat-eye configuration 210. Both the corner cube configuration 205 and the cat-eye configuration 210 may reflect an incoming beam (as shown the incoming beam 215 in the corner cube configuration 205 and the incoming beam 220 in the cat-eye configuration 210) to the same direction from which the incoming beam arrived. The corner cube configuration 205 may be an array of three reflectors 225 or a solid prism, and the incoming beam 215 entering the corner cube configuration 205 may experience two internal reflections adding up to 180 degrees. The cat-eye configuration 210 may include a reflector 230 placed at a focal plane of a lens 235 that reflects back the incoming beam 220.

In some examples, a modulator may be added to the corner cube configuration 205 or the cat-eye configuration 210. By adding a modulator such as a controllable absorber, a phase shifter, or a combination of both, the incoming beam (e.g., the incoming beam 215 or the incoming beam 220) may be modulated and a device having such a modulator may transmit data using OWC without having a laser.

In some examples, an MRR 240 may have the corner cube configuration with reflectors 245 and a modulator 250. Data 255 may be sent through an electronic driver 260 to the modulator 250. The incoming beam or interrogation beam 265 may enter the MRR 240 and may be reflected out as a modulated beam 270 with the data 255 modulated on the reflected interrogation beam 265.

In some examples, an MRR 295 may have the cat-eye configuration and a modulator 285, such as a multiple quantum well. Data 275 may be sent through an electronic driver 280 to the modulator 285. The incoming beam or interrogation beam 265 may enter the MRR 295 and may be reflected out as a modulated beam 270 with the data 275 modulated on the reflected interrogation beam 265.

Figure 3:
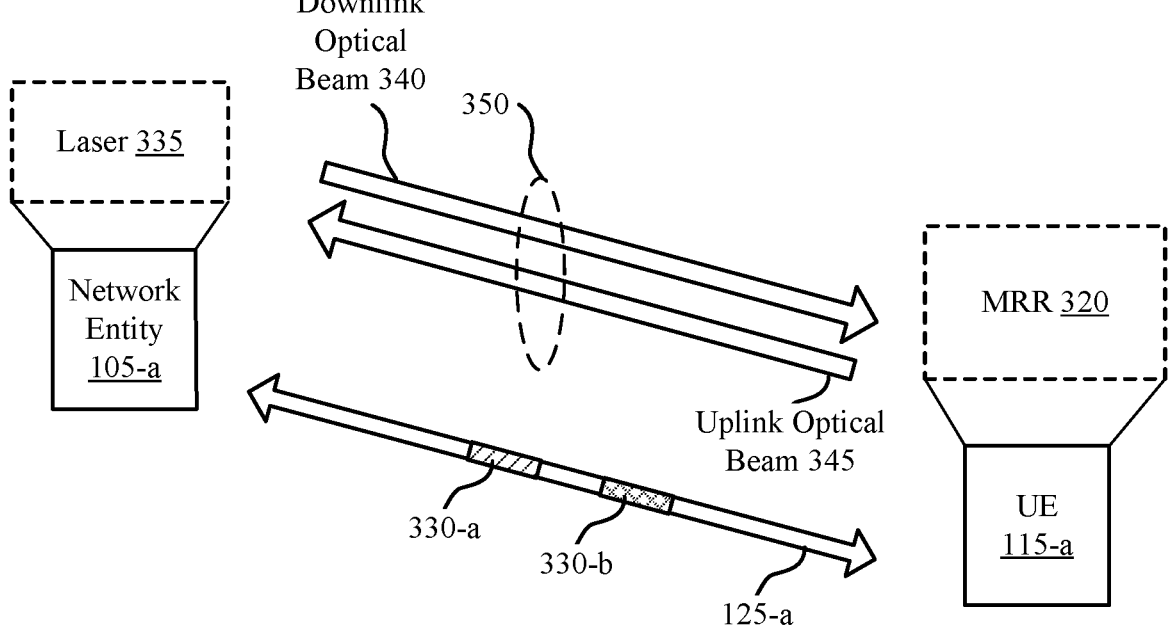
FIG. 3 illustrates an example of a wireless communications system that supports full duplex optical communications with MRR in accordance with one or more aspects of the present disclosure.

FIG. 3 illustrates an example of a wireless communications system 300 that supports full duplex optical communications with MRR in accordance with one or more aspects of the present disclosure. In some examples, wireless communications system 300 may implement aspects of wireless communications system 100. Wireless communications system 300 may include a network entity 105-a, and a UE 115-a. In some examples, the network entity 105-a may be an example of a network entity 105 as described herein, and the UE 115-a may be an example of UE 115 as described herein.

In some examples, the network entity 105-a may include a laser 335, and the UE 115-a may include an MRR 320. The network entity 105-a may transmit a downlink optical beam 340 to the UE 115-a. The UE 115-a may receive downlink optical beam 340 via the MRR 320. The UE 115-a may transmit, via the MRR 320, an uplink optical beam 345 to the network entity 105-a. In some examples, the downlink optical beam 340 may be modulated in accordance with a first modulation scheme, and the uplink optical beam 345 may be transmitted by modulating the downlink optical beam 340 in accordance with a second modulation scheme that is compatible with the first modulation scheme. The downlink optical beam 340 and the uplink optical beam 345 may provide an optical communication connection 350.

In some examples, the network entity 105-a may communicate with the UE 115-a via a communication link 125-a. The communication link 125-a may be an example of an NR or LTE link between the UE 115-a and the network entity 105-a. The communication link 125-a may include a bi-directional link that enable both the uplink and downlink communication. For example, the UE 115-a may transmit uplink signals (e.g., uplink transmissions), such as uplink control signaling or uplink data signals, to the network entity 105-a using the communication link 125-a, and the network entity 105-a may transmit downlink signals (e.g., downlink transmissions), such as downlink control signaling or downlink data signals, to the UE 115-a using the communication link 125-a. For example, the network entity 105-a may communicate transmissions 330-a, such as data transmissions, to the UE 115-a a via the communication link 125-a, and the network entity 105-a may communicate control signaling 330-b, such as control messages, with the UE 115-a. In some examples, the UE 115-a may communicate transmissions 330-a, such as data transmissions, to the network entity 105-a via the communication link 125-a, and the UE 115-a may communicate control signaling 330-b, such as control messages, with the network entity 105-a. In some examples, the UE 115-a and the network entity 105-a may communicate on the optical communication connection 350 in addition to the communication link 125-*a*, for example to access the additional spectrum of the optical communication connection 350. Additionally, or alternatively, the optical communication connection 350 may have a higher throughput or lower latency than the communication link 125-*a*.

In some examples, the control signaling 330-*b* may indicate a first modulation scheme for downlink communications via the downlink optical beam 340 and a second modulation scheme for uplink communications via the uplink optical beam 345. For example, the network entity 105-*a* may transmit, to the UE 115-*a*, a control message indicating the first modulation scheme and/or the second modulation scheme, and/or the UE 115-*a* may transmit, to the network entity 105-*a*, a control message indicating the second modulation scheme.

In some examples, the UE 115-*a* may transmit, to the network entity 105-*a*, control signaling 330-*b* indicating a capability of the UE 115-*a* to support the optical communication connection 350 via MRR. In some examples, the network entity 105-*a* may transmit, to the UE 115-*a*, control signaling 330-*b* indicating a capability of the network entity 105-*a* to support the optical communication connection 350 via the laser 335 to transmit downlink communications via the downlink optical beam 340. In some examples, the UE 115-*a* may transmit, to the network entity 105-*a*, control signaling 330-*b* indicating that the UE 115-*a* includes a laser (or that the UE 115-*a* does not include a laser). If the UE 115-*a* includes the laser, the network entity 105-*a* may transmit, to the UE 115-*a*, control signaling 330-*b* configuring the UE 115-*a* to use the laser for uplink communication based on a distance between the UE 115-*a* and the network entity 105-*a*. For example, the UE 115-*a* may transmit reports indicating the position of the UE 115-*a* via the communication link 125-*a*, or the network entity 105-*a* may determine the position of the UE 115-*a* via reference signals transmitted by the UE 115-*a* via the communication link 125-*a*. In some examples, the UE 115-*a* may transmit control signaling 330-*b* including one or more capability reports, such as available uplink modulation schemes supported by the MRR 320, a maximum modulation speed of the MRR 320, a maximum modulation depth of the MRR 320, an MRR area that may support link budget calculations, a quantity of multiple MRRs 320 mounted on the UE 115-*a*, an angular separation between multiple MRRs mounted on UE 115-*a*, an angular coverage of a single MRR and channels, such as physical uplink shared channel (PUSCH) or physical uplink control channel (PUCCH), supported by the UE 115-*a*.

In some examples, a use case for OWC may be an XR device used for gaming, computer aided design, holographic conferencing or some other application with a short range, extremely high data throughput, and extremely low latency. For example, the UE 115-*a* may be such an XR device. Incorporating the MRR into the XR device may allow simpler, power efficient designs without a laser on XR device. The MRR on the XR device may allow simpler beam management on the XR device side since the optical beam is automatically reflected back along the angle of arrival rather than generating an optical beam with a laser at the XR device. The MRR on the XR device may provide a wide acceptance angle for the downlink optical beam 340, and an asymmetric link may allow for small, wide field of view optics at the XR device.

The UE 115-*a* with MRR 320 may enable OWC without using a laser at the UE 115-*a* thereby lowering cost and simplifying design of an OWC capable UE 115-*a*. The UE 115-*a* with MRR 320 may use minimal beam management from the UE side since the optical beam is automatically reflected back to the network entity 105-*a* by the physics of the MRR 320. The UE 115-*a* with MRR 320 may communicate low latency payloads for increasing link throughput or passing bands control from other channels or RATs. The UE 115-*a* with MRR 320 may inherently support full duplex communication and may not have transmission and receiving switching. The UE 115-*a* with MRR 320 may provide a good fit with 3rd Generation Partnership Project specifications since uplink allocations may be managed by the network entity 105-*a* as the MRR uplink allocations are joined with laser resources to allow back-reflection of data. In some examples, the UE 115-*a* supporting OWC may communicate with the network entity 105-*a* via a low bandwidth communication link, such as frequency range 1 (FR1), that may provide a fall back communications link and allow control of the UE 115-*a* by the network entity 105-*a*. In some examples, the UE 115-*a* with MRR 320 may be integrated with energy harvesting hardware to pull power from the interrogating optical laser beam, such as the downlink optical beam 340.

In some examples, the UE 115-*a* with MRR 320 may provide full duplex communication with the network entity 105-*a*. Since MRR relies on directed laser energy being transmitted from an interrogating node as the interrogating beam to an interrogated node as the retroflected beam, communications via an MRR may be considered full duplex. In some examples, the network entity 105-*a* may transmit a downlink frame on the downlink optical beam 340. The UE 115-*a*, via the MRR 320, may transmit an uplink frame on the uplink optical beam 345 and the uplink frame carries an uplink codeword modulated on the reflection of the downlink optical beam 340 (e.g., instead of simply reflecting the downlink frame). Transmission using an MRR provides simplicity, since the interrogator (e.g., the network entity 105-*a*) does not account for the downlink transmission when receiving an uplink transmission via the uplink optical beam 345 (e.g., because the uplink frame is modulated using a known modulation scheme, the network entity does extract the uplink frame based on the transmitted downlink frame).

In some examples, for full duplex communication, the downlink transmission carrying data may be modulated by the MRR 320 of the UE 115-*a* to obtain a doubly modulated waveform that is to be received and demodulated by the network entity 105-*a* (e.g., the interrogator). To achieve full duplex communication, the UE 115-*a* and network entity 105-*a* may use compatible modulation schemes for downlink communications and uplink communications that may allow double demodulation of the signal without loss of data.

Figure 4:
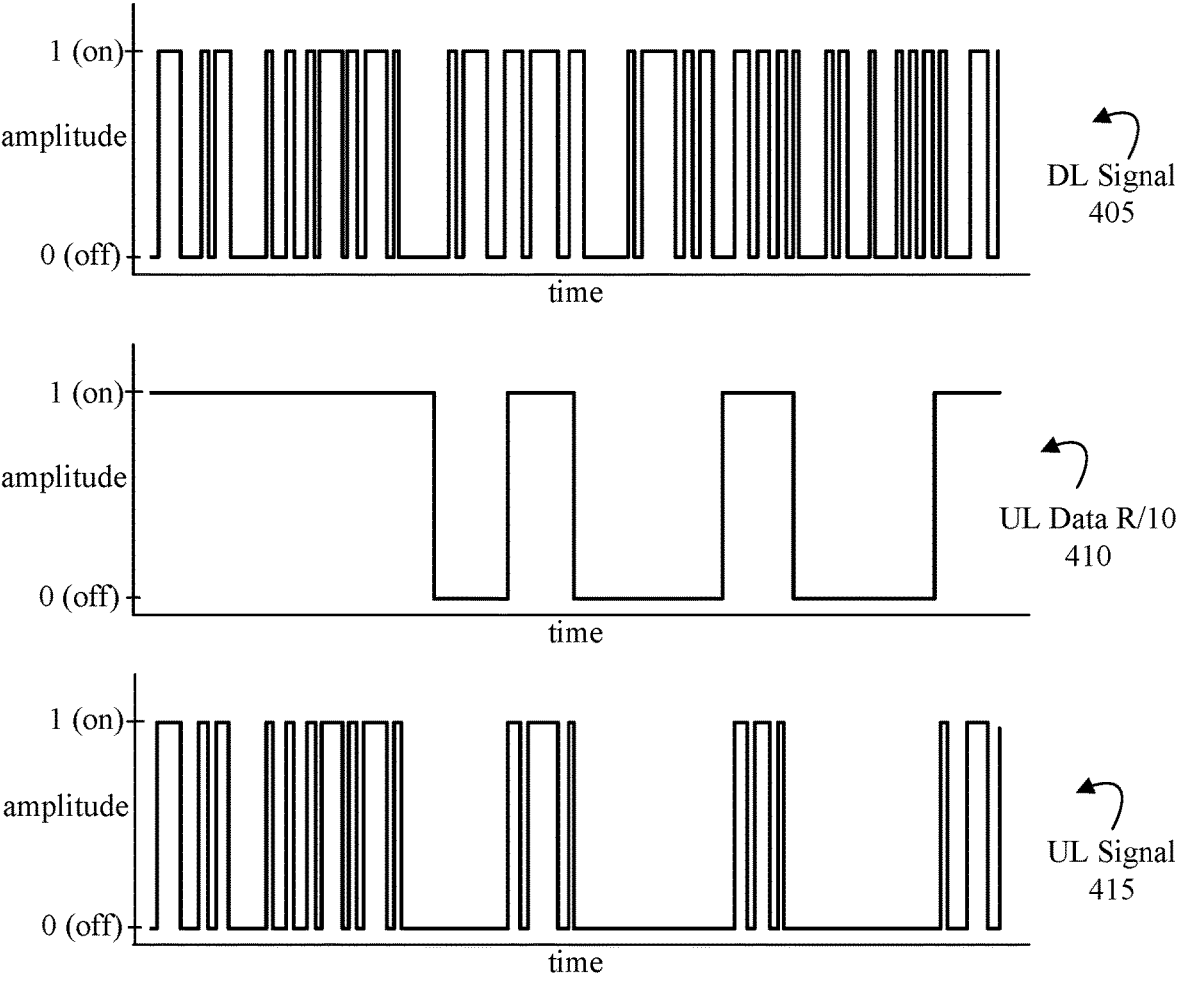
FIG. 4 illustrates examples of waveforms that supports full duplex optical communications with MRR in accordance with one or more aspects of the present disclosure.

FIG. 4 illustrates examples of waveforms 400 that supports full duplex optical communications with MRR in accordance with one or more aspects of the present disclosure. The waveforms 400 may illustrate a downlink modulation scheme and a compatible uplink modulation scheme for transmission in the wireless communications system 100 or wireless communications system 300.

In some examples, the first modulation scheme or the downlink modulation scheme may be a first OOK non-return-to-zero (NRZ) modulation at a first rate and the second modulation scheme or uplink modulation scheme may be a second OOK NRZ at a second rate lower than the first rate. In some examples, the second rate may be one tenth of the first rate. Referring to FIG. 4, a downlink signal waveform 405 with the OOK NRZ modulation at a first rate (R), an uplink data waveform 410 and uplink signal waveform 415 with the OOK NRZ modulation at the second rate one tenth of the first rate are illustrated. Occasionally, there may be a long series of zeros which will cause uplink signal to be muted (e.g., no energy to modulate), and a small, known rate of erasures in channel may be handled by code, such as $P_{erasure}=2-R/r$.

Figure 5:
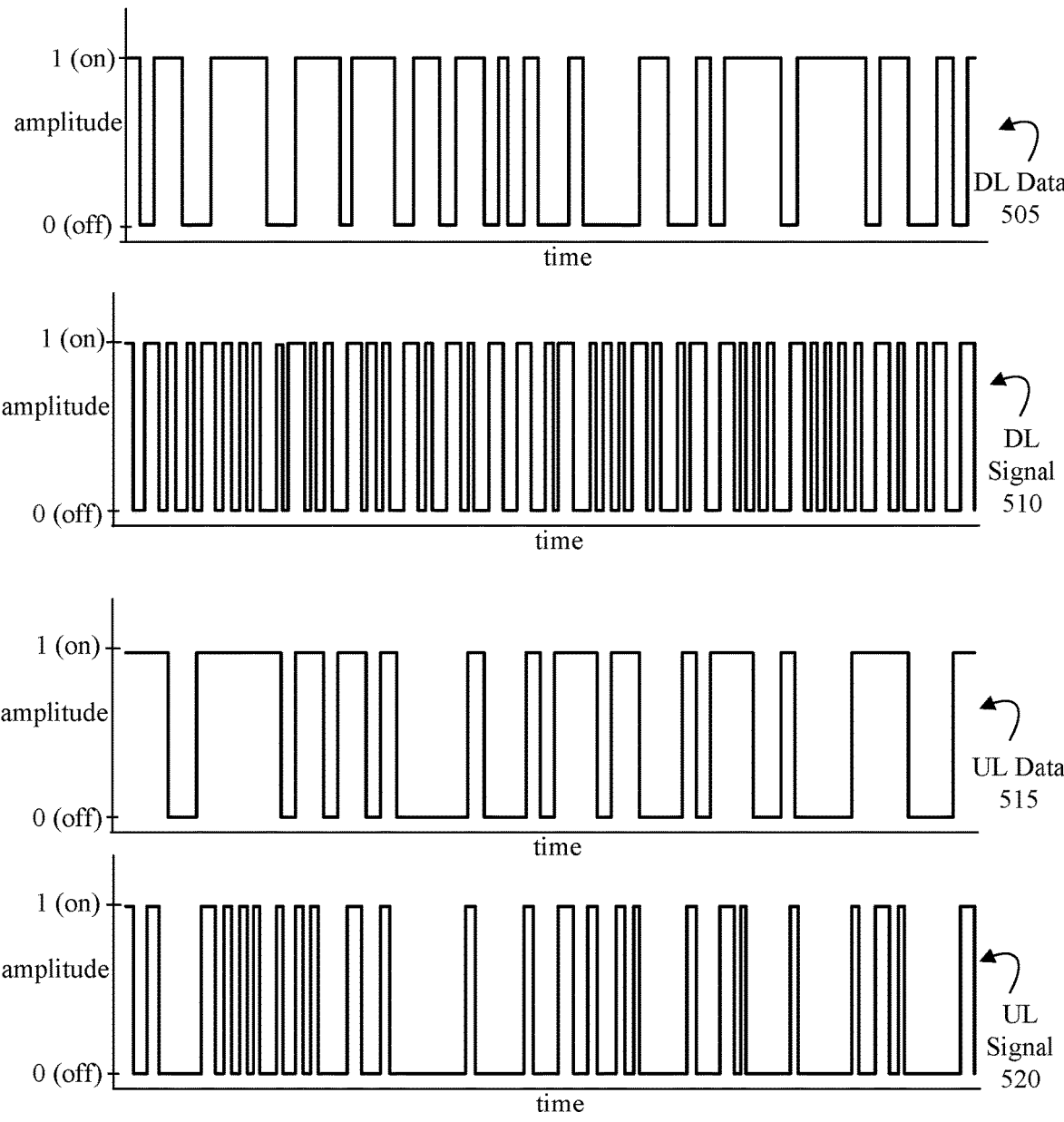
FIG. 5 illustrates example of waveforms that supports full duplex optical communications with MRR in accordance with one or more aspects of the present disclosure.

FIG. 5 illustrates examples of waveforms 500 that supports full duplex optical communications with MRR in accordance with one or more aspects of the present disclosure. The waveforms 500 may illustrate a downlink modulation scheme and a compatible uplink modulation scheme for transmission in the wireless communications system 100 or wireless communications system 300.

In some examples, the first modulation scheme or the downlink modulation scheme may be a return-to-zero (RZ) Manchester scheme or similar scheme at a first rate and the second modulation scheme or uplink modulation scheme may be an OOK NRZ at a second rate same as the first rate. Referring to FIG. 5, a downlink data waveform 505, a downlink signal waveform 510 with the RZ Manchester modulation, an uplink data waveform 515 and uplink signal waveform 520 with the OOK NRZ modulation at the same rate as the RZ Manchester modulation are illustrated. The first modulation scheme as RZ Manchester modulation at a first rate and the second modulation scheme as OOK NRZ modulation at the first rate may provide no erasures and effectively higher bandwidth.

In some examples, the first modulation scheme or the downlink modulation scheme may be an RZ Manchester scheme or similar scheme and the second modulation scheme or uplink modulation scheme may be a phase modulation scheme. In some examples, optical phase modulation may be provided by a local laser at the UE 115-*a* phase locked to the transmission laser. In some examples, it may be possible for the network entity 105-*a* to receive phase modulation from the MRR 320 uplink signal since the reflected data stream uses the same laser that originated at the optical beam transmission. Therefore, imposing a phase modulation on the uplink optical beam 345 may be possible with low complexity. Phase modulation as the uplink modulation scheme may retain the full power at uplink rather than modulation to 50% power.

In some examples, the first modulation scheme or the downlink modulation scheme may be a Manchester scheme or similar scheme and the second modulation scheme or uplink modulation scheme may be PAM, such as 4-PAM. In another example, the first modulation scheme or the downlink modulation scheme may be a Manchester scheme or similar scheme and the second modulation scheme or uplink modulation scheme may be QAM, such as 16-QAM. In some examples, the first modulation scheme or downlink modulation scheme may not be full-powered modulation (e.g., where a "1" value is represented by a full power transmission and a "0" value is represented by no power). An example of a non-full power modulation may be OOK with 1 being represented by full power and 0 being represented by partial power (e.g., full power of 1 and partial power of 0.5).

In some examples, each bit value is represented by a positive transmission power level. An example of each bit value being represented by a positive transmission power level may be OOK with 1 being represented by 90% of full positive transmission power and 0 being represented by a lower positive transmission power, such as 20% of full positive transmission power. In some examples, the first modulation scheme is a multi-level pulse amplitude modulation scheme. For multi-level pulse amplitude modulation, the downlink transmission power is "0" a smaller proportion of time, so more downlink transmission power may be available for reflection by the MRR. For example, for 2 level pulse amplitude modulation, the downlink transmission power will be "0" approximately half of the time. For 4 level PAM, the downlink transmission power would be "0" approximately ¼ of the time, so the MRR may reflect at a higher rate.

Figure 6:
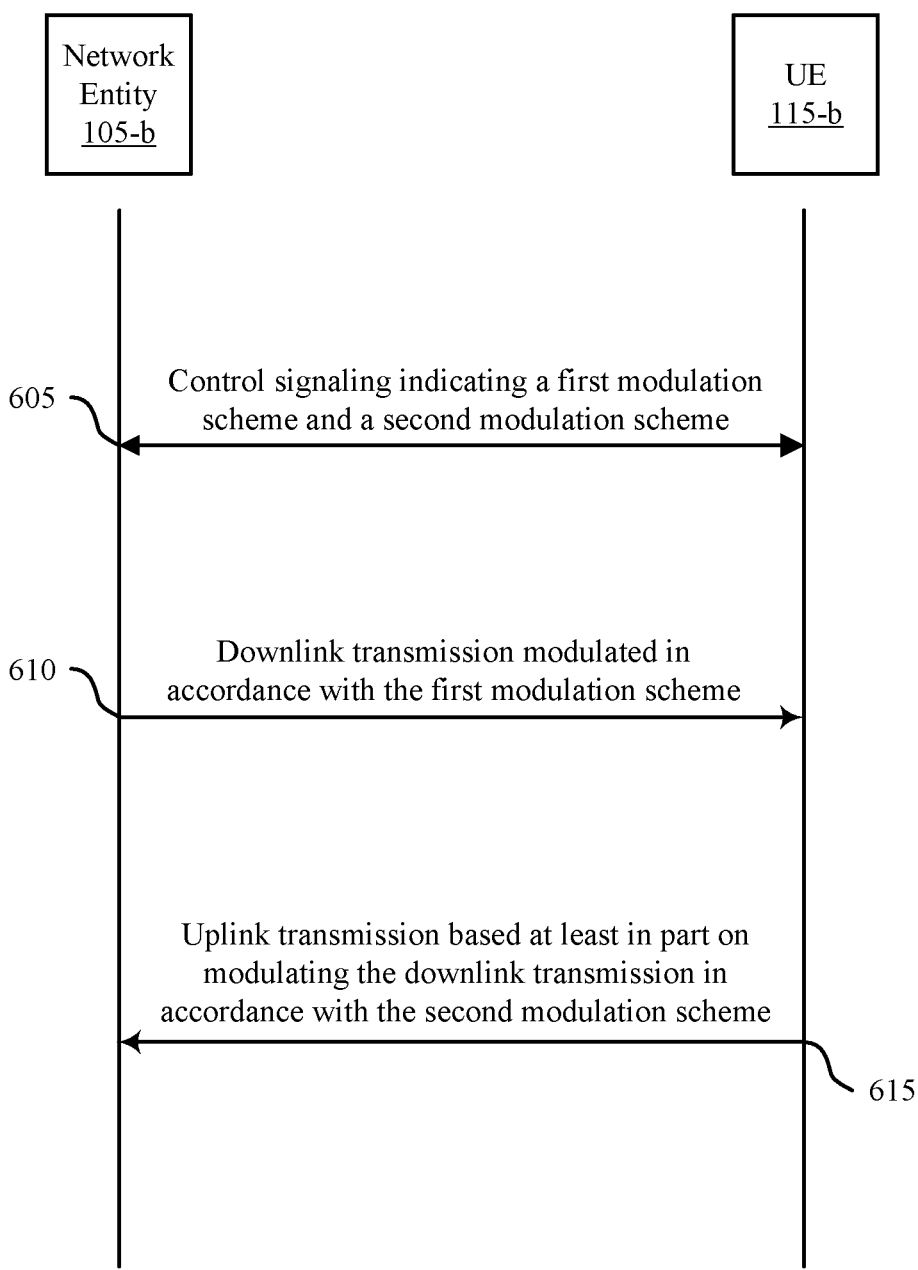
FIG. 6 illustrates an example of a process flow that supports full duplex optical communications with MRR in accordance with one or more aspects of the present disclosure.
Figure 6:

FIG. 6 illustrates an example of a process flow 600 that supports full duplex optical communications with MRR in accordance with one or more aspects of the present disclosure. The process flow 600 may include a network entity 105-*b* which may be an example of a network entity 105 as described herein. The process flow 600 may include a UE 115-*b* which may be an example of a UE 115 and a UE 115-*a* as described herein. In the following description of the process flow 600, the operations between the network entity 105-*b* and the UE 115-*b* may be transmitted in a different order than the example order shown, or the operations performed by the network entity 105-*b* and the UE 115-*b* may be performed in different orders or at different times. Some operations may also be omitted from the process flow 600, and other operations may be added to the process flow 600.

At 605, the UE 115-*b* may communicate, with the network entity 105-*b*, control signaling indicating a first modulation scheme for downlink communication via an optical communication connection and a second modulation scheme for uplink communication via the optical communication connection. At 610, the UE 115-*b* may receive, from the network entity 105-*b* via the optical communication connection, a downlink transmission modulated in accordance with the first modulation scheme. At 615, the UE 115-*b* may transmit, to the network entity 105-*b* via the optical communication connection, an uplink transmission based at least in part on modulating the downlink transmission in accordance with the second modulation scheme.

In some examples, the UE 115-*b* may transmit, to the network entity 105-*b*, an indication of a capability of the UE 115-*b* to support the optical communication connection via modulated retro reflection. In some examples, the control signaling is received based on the indication (e.g., the network entity 105-*b* transmits the control signaling in response to the indication).

In some examples, the UE 115-*b* may transmit, to the network entity 105-*b*, a capability indication that indicates the UE 115-*b* includes a laser. The UE 115-*b* may receive, from the network entity 105-*b*, control signaling configuring the UE 115-*b* to use the laser for uplink communication via the optical communication connection based on a distance between the UE 115-*b* and the network entity 105-*b*.

In some examples, the UE 115-*b* may transmit, to the network entity 105-*b*, an indication of a capability of the UE 115-*b* to support full duplex communications via the optical communication connection. The control signaling may be received based on the indication.

In some examples, the UE 115-*b* may communicate one or more control messages to negotiate the first modulation scheme and the second modulation scheme. In some examples, the UE 115-*b* may receive, from the network entity 105-*b*, a first control message indicating the first modulation scheme. In some examples, the UE 115-*b* may transmit, to the network entity 105-*b*, a second control message indicating the second modulation scheme from a set of modulation schemes compatible with the first modulation scheme. In some examples, the UE 115-*b* may receive, from the network entity 105-b, a second control message indicating the second modulation scheme.

In some examples, the downlink transmission may be modulated via modulated retro reflection. In some examples, the optical communication connection may include a full duplex communication connection. Accordingly, the UE 115-b and the network entity 105-b may achieve high throughput and low latency associated with full duplex communications using modulated retro reflection at the UE 115-b (e.g., without an active laser at the UE 115-b). Achieving full duplex communications without an active laser at the UE 115-b may reduce manufacturing costs and power consumption of the UE 115-b.

In some examples, the first modulation scheme may be a first OOK NRZ modulation at a first rate, and the second modulation scheme may be a second OOK NRZ modulation at a second rate lower than the first rate. In some examples, the first modulation scheme may be a RTZ Manchester modulation at a first rate, and the second modulation scheme may be one of OOK NRZ modulation at the first rate, a PAM, or a QAM. In some examples, the first modulation scheme may be an amplitude modulation scheme, and the second modulation scheme may be a phase modulation scheme. In some examples, for the first modulation scheme, each bit value may be represented by a positive transmission power level. In some examples, the first modulation scheme may be a multi-level pulse amplitude modulation scheme.

Figure 7:
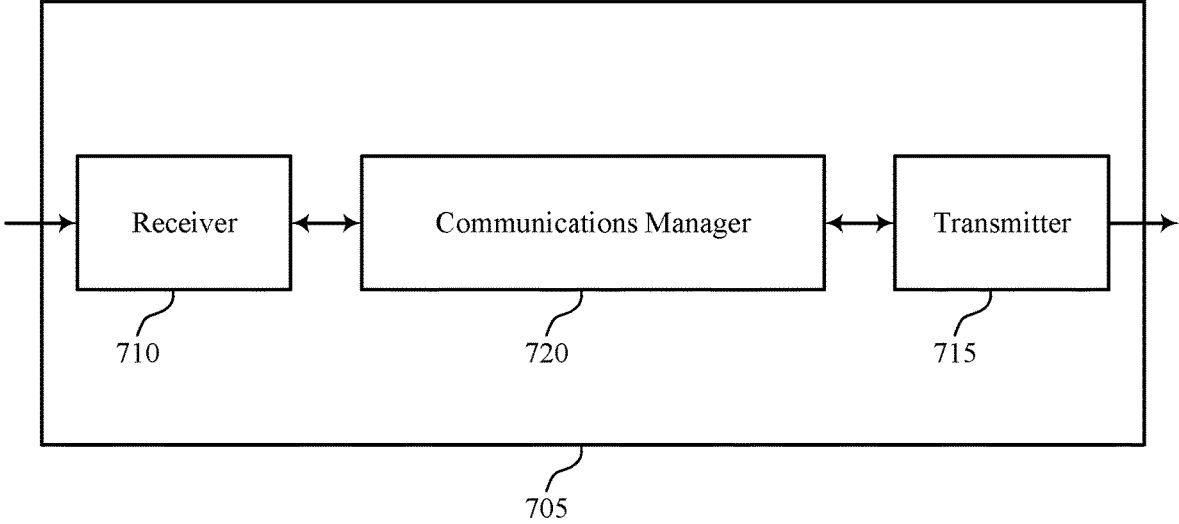
FIGS. 7 and 8 illustrate block diagrams of devices that support full duplex optical communications with MRR in accordance with one or more aspects of the present disclosure.

FIG. 7 illustrates a block diagram 700 of a device 705 that supports full duplex optical communications with MRR in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to full duplex optical communications with MRR). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to full duplex optical communications with MRR). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of full duplex optical communications with MRR as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. For example, the communications manager 720 may be configured as or otherwise support a means for communicating, with a network entity, control signaling indicating a first modulation scheme for downlink communication via an optical communication connection and a second modulation scheme for uplink communication via the optical communication connection. The communications manager 720 may be configured as or otherwise support a means for receiving, from the network entity via the optical communication connection, a downlink transmission modulated in accordance with the first modulation scheme. The communications manager 720 may be configured as or otherwise support a means for transmitting, to the network entity via the optical communication connection, an uplink transmission based on modulating the downlink transmission in accordance with the second modulation scheme.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced processing, reduced power consumption, and more efficient utilization of communication resources.

Figure 8:
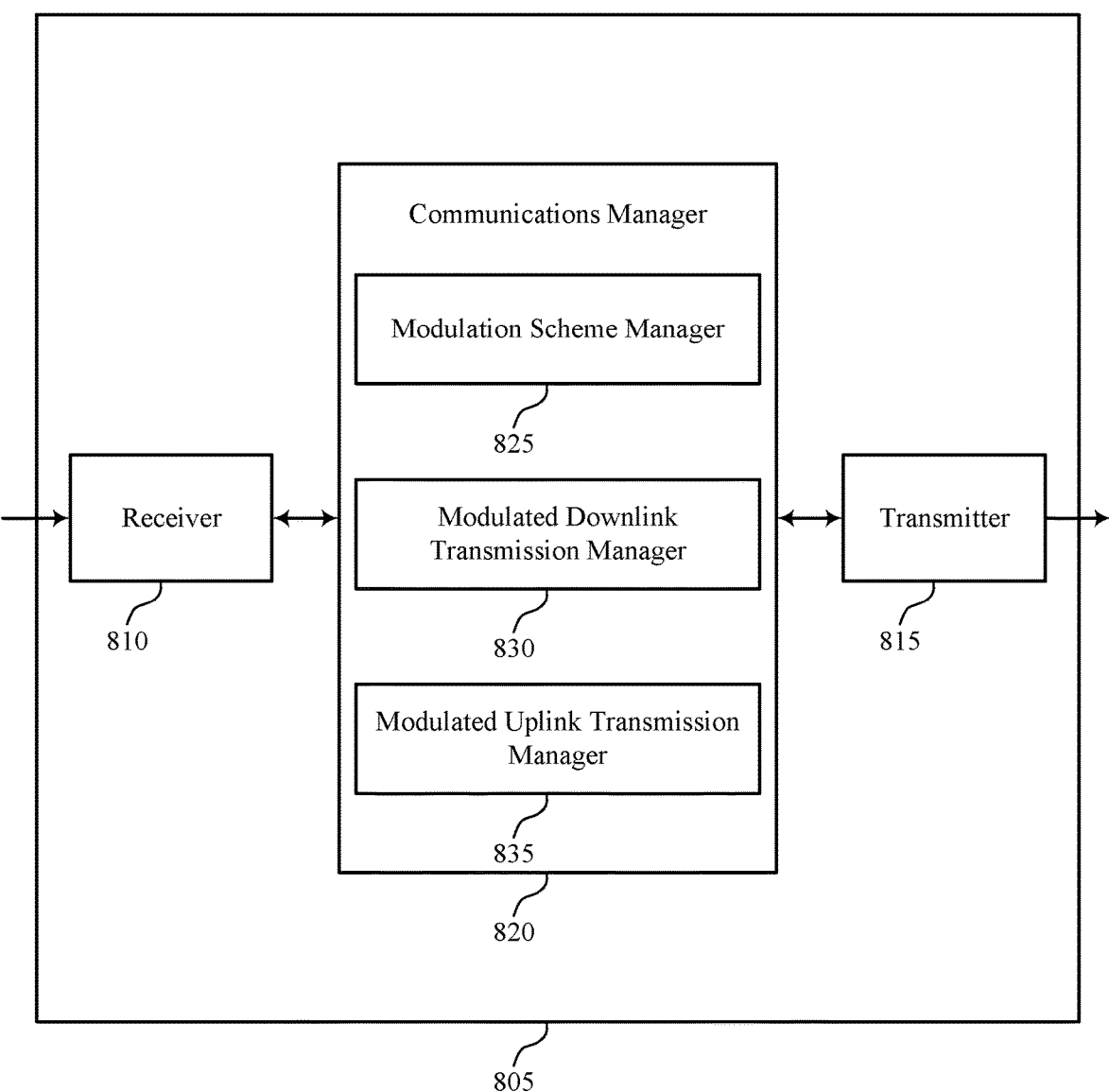

FIG. 8 illustrates a block diagram 800 of a device 805 that supports full duplex optical communications with MRR in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to full duplex optical communications with MRR). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to full duplex optical communications with MRR). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of full duplex optical communications with MRR as described herein. For example, the communications manager 820 may include a modulation scheme manager 825, a modulated downlink transmission manager 830, a modulated uplink transmission manager 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. The modulation scheme manager 825 may be configured as or otherwise support a means for communicating, with a network entity, control signaling indicating a first modulation scheme for downlink communication via an optical communication connection and a second modulation scheme for uplink communication via the optical communication connection. The modulated downlink transmission manager 830 may be configured as or otherwise support a means for receiving, from the network entity via the optical communication connection, a downlink transmission modulated in accordance with the first modulation scheme. The modulated uplink transmission manager 835 may be configured as or otherwise support a means for transmitting, to the network entity via the optical communication connection, an uplink transmission based on modulating the downlink transmission in accordance with the second modulation scheme.

Figure 9:
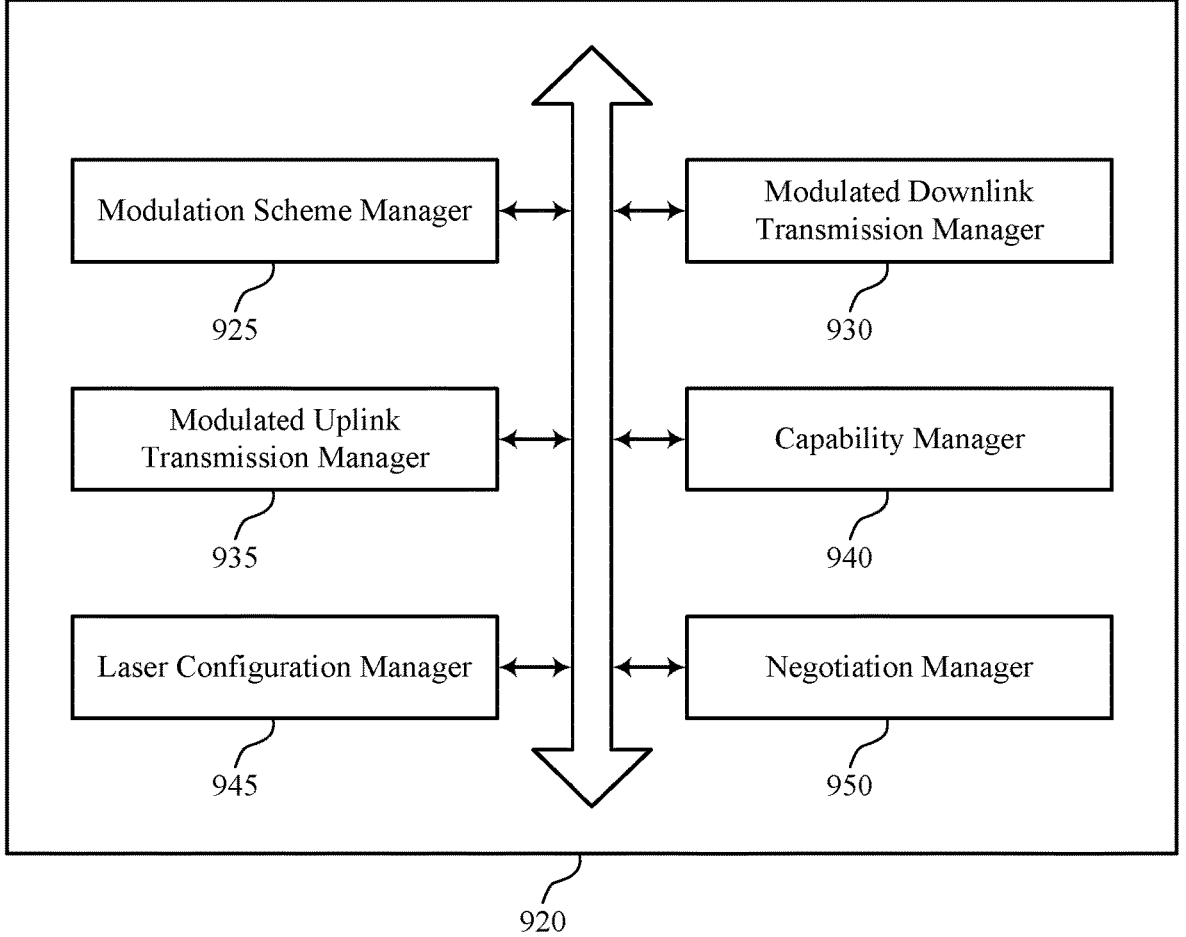
FIG. 9 illustrates a block diagram of a communications manager that supports full duplex optical communications with MRR in accordance with one or more aspects of the present disclosure.

FIG. 9 illustrates a block diagram 900 of a communications manager 920 that supports full duplex optical communications with MRR in accordance with one or more aspects of the present disclosure. The communications manager 920 may be an example of aspects of a communications manager

720, a communications manager 820, or both, as described herein. The communications manager 920, or various components thereof, may be an example of means for performing various aspects of full duplex optical communications with MRR as described herein. For example, the communications manager 920 may include a modulation scheme manager 925, a modulated downlink transmission manager 930, a modulated uplink transmission manager 935, a capability manager 940, a laser configuration manager 945, a negotiation manager 950, or any combination thereof. Each of these components may communicate, directly or indirectly, with one another (e.g., via one or more buses).

The communications manager 920 may support wireless communications at a UE in accordance with examples as disclosed herein. The modulation scheme manager 925 may be configured as or otherwise support a means for communicating, with a network entity, control signaling indicating a first modulation scheme for downlink communication via an optical communication connection and a second modulation scheme for uplink communication via the optical communication connection. The modulated downlink transmission manager 930 may be configured as or otherwise support a means for receiving, from the network entity via the optical communication connection, a downlink transmission modulated in accordance with the first modulation scheme. The modulated uplink transmission manager 935 may be configured as or otherwise support a means for transmitting, to the network entity via the optical communication connection, an uplink transmission based on modulating the downlink transmission in accordance with the second modulation scheme.

In some examples, the capability manager 940 may be configured as or otherwise support a means for transmitting, to the network entity, an indication of a capability of the UE to support the optical communication connection via modulated retro reflection, where the control signaling is received based on the indication.

In some examples, the capability manager 940 may be configured as or otherwise support a means for transmitting, to the network entity, a capability indication that indicates the UE includes a laser. In some examples, the laser configuration manager 945 may be configured as or otherwise support a means for receiving, from the network entity, control signaling configuring the UE to use the laser for uplink communication via the optical communication connection based on a distance between the UE and the network entity.

In some examples, the capability manager 940 may be configured as or otherwise support a means for transmitting, to the network entity, an indication of a capability of the UE to support full duplex communications via the optical communication connection, where the control signaling is received based on the indication.

In some examples, to support communicating the control signaling, the negotiation manager 950 may be configured as or otherwise support a means for communicating one or more control messages to negotiate the first modulation scheme and the second modulation scheme.

In some examples, to support communicating the one or more control messages, the negotiation manager 950 may be configured as or otherwise support a means for receiving, from the network entity, a first control message indicating the first modulation scheme.

In some examples, to support communicating the one or more control messages, the negotiation manager 950 may be configured as or otherwise support a means for transmitting, to the network entity, a second control message indicating the second modulation scheme from a set of modulation schemes compatible with the first modulation scheme.

In some examples, to support communicating the one or more control messages to negotiate, the negotiation manager 950 may be configured as or otherwise support a means for receiving, from the network entity, a second control message indicating the second modulation scheme.

In some examples, the downlink transmission is modulated via modulated retro reflection.

In some examples, the optical communication connection includes a full duplex communication connection.

In some examples, the first modulation scheme is a first OOK NRZ modulation at a first rate and the second modulation scheme is a second OOK NRZ modulation at a second rate lower than the first rate.

In some examples, the first modulation scheme is a RTZ Manchester modulation at a first rate and the second modulation scheme is one of OOK NRZ modulation at the first rate, a PAM, or a QAM.

In some examples, the first modulation scheme is an amplitude modulation scheme and the second modulation scheme is a phase modulation scheme.

In some examples, for the first modulation scheme, each bit value is represented by a positive transmission power level.

In some examples, the first modulation scheme is an multi-level pulse amplitude modulation scheme.

Figure 10:
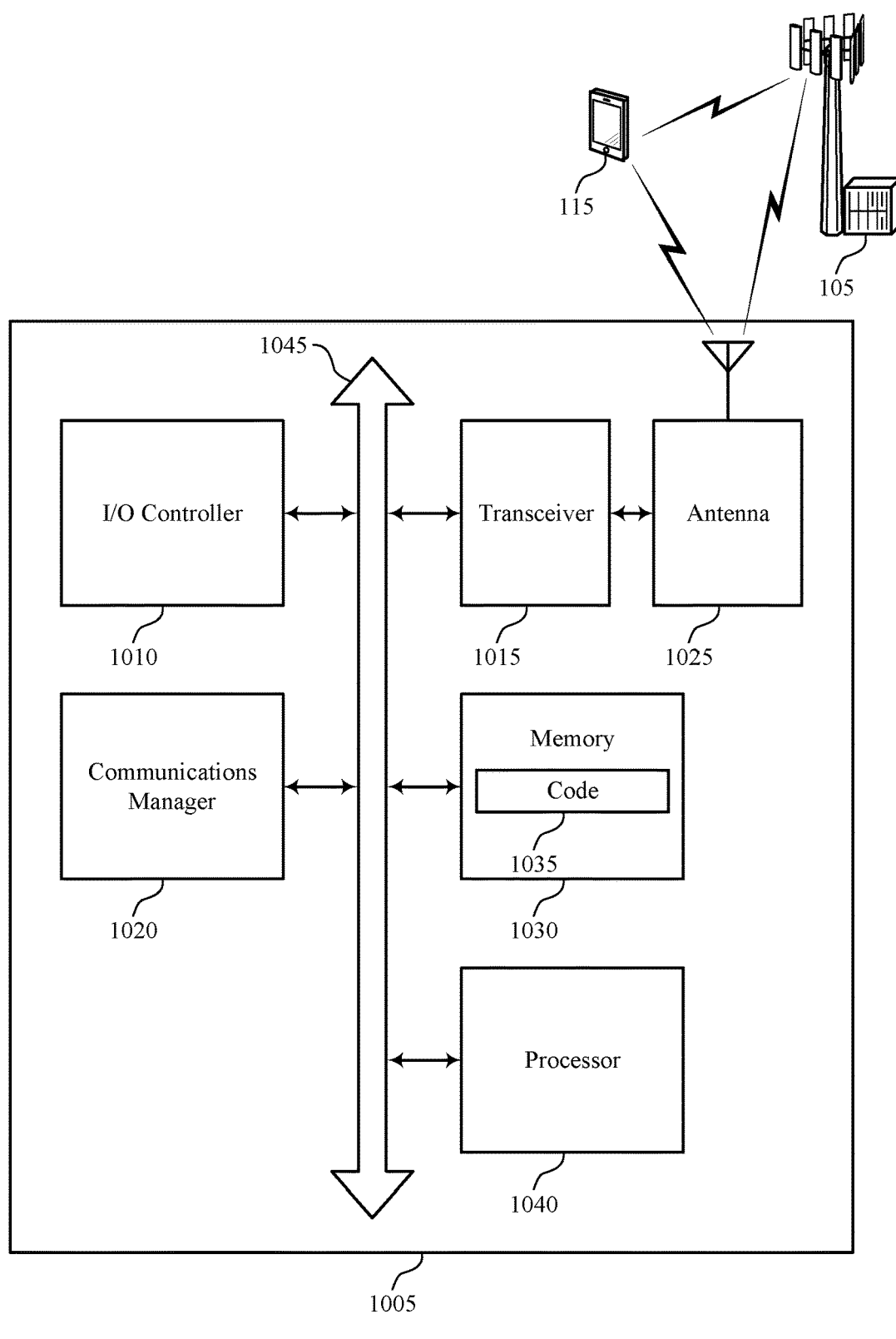
FIG. 10 illustrates a diagram of a system including a device that supports full duplex optical communications with MRR in accordance with one or more aspects of the present disclosure.

FIG. 10 illustrates a diagram of a system 1000 including a device 1005 that supports full duplex optical communications with MRR in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting full duplex optical communications with MRR). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for communicating, with a network entity, control signaling indicating a first modulation scheme for downlink communication via an optical communication connection and a second modulation scheme for uplink communication via the optical communication connection. The communications manager 1020 may be configured as or otherwise support a means for receiving, from the network entity via the optical communication connection, a downlink transmission modulated in accordance with the first modulation scheme. The communications manager 1020 may be configured as or otherwise support a means for transmitting, to the network entity via the optical communication connection, an uplink transmission based on modulating the downlink transmission in accordance with the second modulation scheme.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of full duplex optical communications with MRR as described herein, or the processor 1040 and the memory 1030 may be otherwise configured to perform or support such operations.

Figure 11:
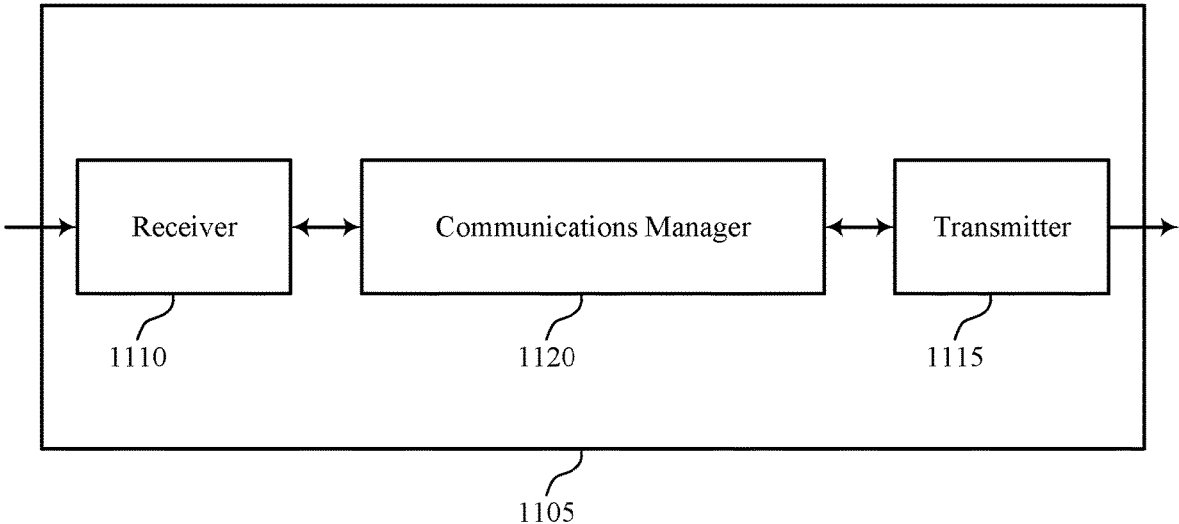
FIGS. 11 and 12 illustrate block diagrams of devices that support full duplex optical communications with MRR in accordance with one or more aspects of the present disclosure.

FIG. 11 illustrates a block diagram 1100 of a device 1105 that supports full duplex optical communications with MRR in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of full duplex optical communications with MRR as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. For example, the communications manager 1120 may be configured as or otherwise support a means for communicating, with a UE, control signaling indicating a first modulation scheme for downlink communication via an optical communication connection and a second modulation scheme for uplink communication via the optical communication connection. The communications manager 1120 may be configured as or otherwise support a means for transmitting, to the UE via the optical communication connection, a downlink transmission modulated in accordance with the first modulation scheme. The communications manager 1120 may be configured as or otherwise support a means for receiving, from the UE via the optical communication connection, an uplink transmission modulated in accordance with the second modulation scheme.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for reduced processing, reduced power consumption, more efficient utilization of communication resources.

Figure 12:
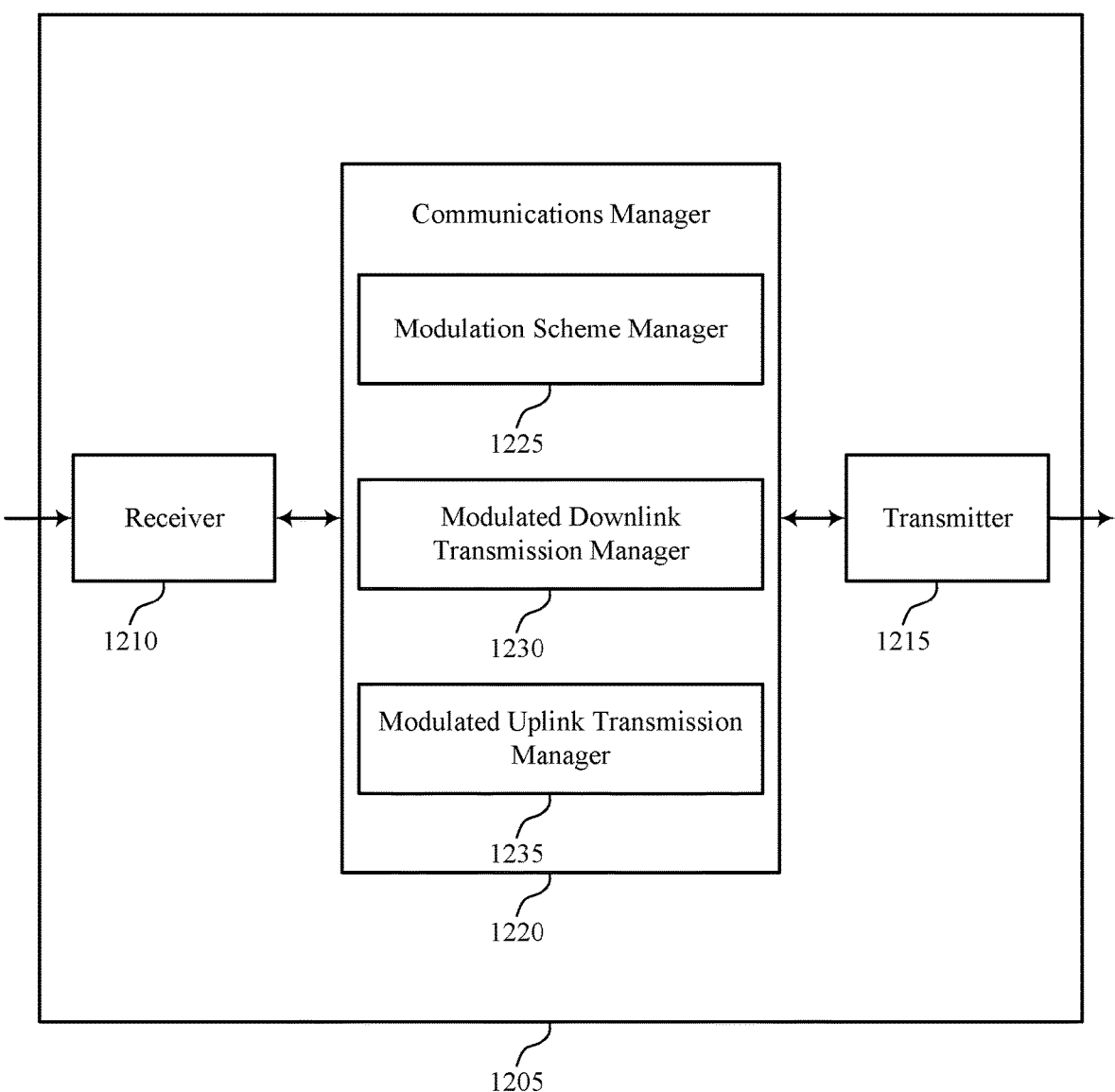

FIG. 12 illustrates a block diagram 1200 of a device 1205 that supports full duplex optical communications with MRR in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of full duplex optical communications with MRR as described herein. For example, the communications manager 1220 may include a modulation scheme manager 1225, a modulated downlink transmission manager 1230, a modulated uplink transmission manager 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network entity in accordance with examples as disclosed herein. The modulation scheme manager 1225 may be configured as or otherwise support a means for communicating, with a UE, control signaling indicating a first modulation scheme for downlink communication via an optical communication connection and a second modulation scheme for uplink communication via the optical communication connection. The modulated downlink transmission manager 1230 may be configured as or otherwise support a means for transmitting, to the UE via the optical communication connection, a downlink transmission modulated in accordance with the first modulation scheme. The modulated uplink transmission manager 1235 may be configured as or otherwise support a means for receiving, from the UE via the optical communication connection, an uplink transmission modulated in accordance with the second modulation scheme.

Figure 13:
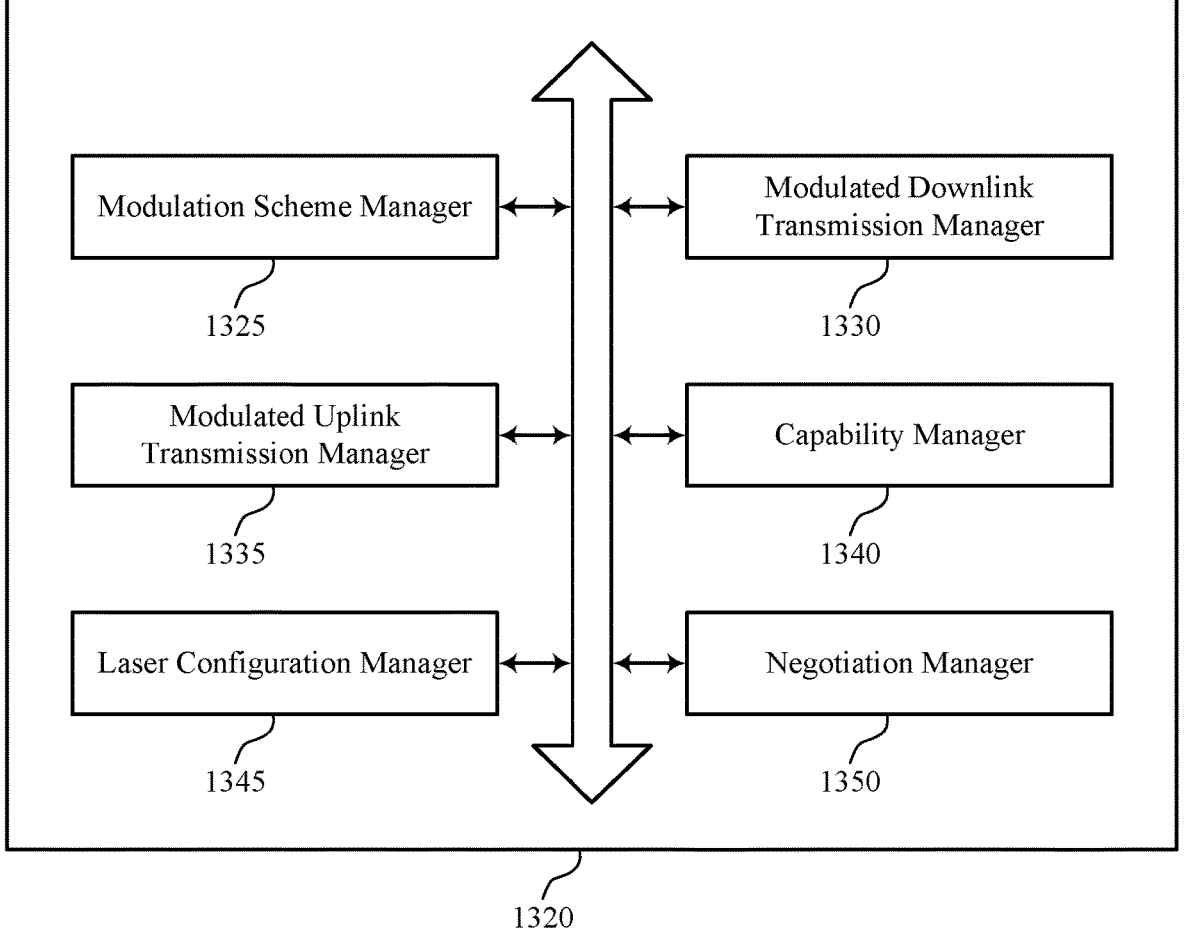
FIG. 13 illustrates a block diagram of a communications manager that supports full duplex optical communications with MRR in accordance with one or more aspects of the present disclosure.

FIG. 13 illustrates a block diagram 1300 of a communications manager 1320 that supports full duplex optical communications with MRR in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of full duplex optical communications with MRR as described herein. For example, the communications manager 1320 may include a modulation scheme manager 1325, a modulated downlink transmission manager 1330, a modulated uplink transmission manager 1335, a capability manager 1340, a laser configuration manager 1345, a negotiation manager 1350, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications at a network entity in accordance with examples as disclosed herein. The modulation scheme manager 1325 may be configured as or otherwise support a means for communicating, with a UE, control signaling indicating a first modulation scheme for downlink communication via an optical communication connection and a second modulation scheme for uplink communication via the optical communication connection. The modulated downlink transmission manager 1330 may be configured as or otherwise support a means for transmitting, to the UE via the optical communication connection, a downlink transmission modulated in accordance with the first modulation scheme. The modulated uplink transmission manager 1335 may be configured as or otherwise support a means for receiving, from the UE via the optical communication connection, an uplink transmission modulated in accordance with the second modulation scheme.

In some examples, the capability manager 1340 may be configured as or otherwise support a means for receiving, from the UE, an indication of a capability of the UE to support the optical communication connection via modulated retro reflection, where the control signaling is transmitted based on the indication.

In some examples, the capability manager 1340 may be configured as or otherwise support a means for receiving, from the UE, a capability indication that indicates the UE includes a laser. In some examples, the laser configuration manager 1345 may be configured as or otherwise support a means for transmitting, to the UE, control signaling configuring the UE to use the laser for uplink communication via the optical communication connection based on a distance between the UE and the network entity.

In some examples, the optical communication connection includes a full duplex communication connection.

In some examples, the capability manager 1340 may be configured as or otherwise support a means for receiving, from the UE, an indication of a capability of the UE to support full duplex communications via the optical communication connection, where the control signaling is transmitted based on the indication.

In some examples, to support communicating the control signaling, the negotiation manager 1350 may be configured as or otherwise support a means for communicating one or more control messages to negotiate the first modulation scheme and the second modulation scheme.

In some examples, to support communicating the one or more control messages to negotiate, the negotiation manager 1350 may be configured as or otherwise support a means for transmitting, to the UE, a first control message indicating the first modulation scheme.

In some examples, to support communicating the one or more control messages to negotiate, the negotiation manager 1350 may be configured as or otherwise support a means for transmitting, to the UE, a second control message indicating the second modulation scheme.

In some examples, to support communicating the one or more control messages to negotiate, the negotiation manager 1350 may be configured as or otherwise support a means for receiving, from the UE, a second control message indicating the second modulation scheme from a set of modulation schemes compatible with the first modulation scheme.

In some examples, the first modulation scheme is a first OOK NRZ modulation at a first rate and the second modulation scheme is a second OOK NRZ modulation at a second rate lower than the first rate.

In some examples, the first modulation scheme is a RTZ Manchester modulation at a first rate and the second modulation scheme is one of OOK NRZ modulation at the first rate, a PAM, or a QAM.

In some examples, the first modulation scheme is an amplitude modulation scheme and the second modulation scheme is a phase modulation scheme.

In some examples, for the first modulation scheme, each bit value is represented by a positive transmission power level.

In some examples, the first modulation scheme is an multi-level pulse amplitude modulation scheme.

Figure 14:
FIG. 14 illustrates a diagram of a system including a device that supports full duplex optical communications with MRR in accordance with one or more aspects of the present disclosure.

FIG. 14 illustrates a diagram of a system 1400 including a device 1405 that supports full duplex optical communications with MRR in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting full duplex optical communications with MRR). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications at a network entity in accordance with examples as disclosed herein. For example, the communications manager 1420 may be configured as or otherwise support a means for communicating, with a UE, control signaling indicating a first modulation scheme for downlink communication via an optical communication connection and a second modulation scheme for uplink communication via the optical communication connection. The communications manager 1420 may be configured as or otherwise support a means for transmitting, to the UE via the optical communication connection, a downlink transmission modulated in accordance with the first modulation scheme. The communications manager 1420 may be configured as or otherwise support a means for receiving, from the UE via the optical communication connection, an uplink transmission modulated in accordance with the second modulation scheme.

By including or configuring the communications manager 1420 in accordance with examples as described herein, the device 1405 may support techniques for improved communication reliability, reduced latency, improved user experience related to reduced processing, reduced power consumption, more efficient utilization of communication resources, improved coordination between devices, longer battery life, improved utilization of processing capability.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, the processor 1435, the memory 1425, the code 1430, or any combination thereof. For example, the code 1430 may include instructions executable by the processor 1435 to cause the device 1405 to perform various aspects of full duplex optical communications with MRR as described herein, or the processor 1435 and the memory 1425 may be otherwise configured to perform or support such operations.

FIG. 15 illustrates a flowchart illustrating a method 1500 that supports full duplex optical communications with MRR in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include communicating, with a network entity, control signaling indicating a first modulation scheme for downlink communication via an optical communication connection and a second modulation scheme for uplink communication via the optical communication connection. The operations of 1505 may be performed in accordance with examples as disclosed herein. In some examples, aspects of the operations of 1505 may be performed by a modulation scheme manager 925 as described with reference to FIG. 9.

At 1510, the method may include receiving, from the network entity via the optical communication connection, a downlink transmission modulated in accordance with the first modulation scheme. The operations of 1510 may be performed in accordance with examples as disclosed herein. In some examples, aspects of the operations of 1510 may be performed by a modulated downlink transmission manager 930 as described with reference to FIG. 9.

At 1515, the method may include transmitting, to the network entity via the optical communication connection, an uplink transmission based on modulating the downlink transmission in accordance with the second modulation scheme. The operations of 1515 may be performed in accordance with examples as disclosed herein.

In some examples, aspects of the operations of 1515 may be performed by a modulated uplink transmission manager 935 as described with reference to FIG. 9.

FIG. 16 illustrates a flowchart illustrating a method 1600 that supports full duplex optical communications with MRR in accordance with one or more aspects of the present disclosure. The operations of the method 1600 may be implemented by a network entity or its components as described herein. For example, the operations of the method 1600 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1605, the method may include communicating, with a UE, control signaling indicating a first modulation scheme for downlink communication via an optical communication connection and a second modulation scheme for uplink communication via the optical communication connection. The operations of 1605 may be performed in accordance with examples as disclosed herein. In some examples, aspects of the operations of 1605 may be performed by a modulation scheme manager 1325 as described with reference to FIG. 13.

At 1610, the method may include transmitting, to the UE via the optical communication connection, a downlink transmission modulated in accordance with the first modulation scheme. The operations of 1610 may be performed in accordance with examples as disclosed herein. In some examples, aspects of the operations of 1610 may be performed by a modulated downlink transmission manager 1330 as described with reference to FIG. 13.

At 1615, the method may include receiving, from the UE via the optical communication connection, an uplink transmission modulated in accordance with the second modulation scheme. The operations of 1615 may be performed in accordance with examples as disclosed herein. In some examples, aspects of the operations of 1615 may be performed by a modulated uplink transmission manager 1335 as described with reference to FIG. 13.

The following provides an overview of aspects of the present disclosure:

Aspect 1: A method for wireless communications at a UE, comprising: communicating, with a network entity, control signaling indicating a first modulation scheme for downlink communication via an optical communication connection and a second modulation scheme for uplink communication via the optical communication connection; receiving, from the network entity via the optical communication connection, a downlink transmission modulated in accordance with the first modulation scheme; and transmitting, to the network entity via the optical communication connection, an uplink transmission based at least in part on modulating the downlink transmission in accordance with the second modulation scheme.

Aspect 2: The method of aspect 1, further comprising: transmitting, to the network entity, an indication of a capability of the UE to support the optical communication connection via modulated retro reflection, wherein the control signaling is received based at least in part on the indication.

Aspect 3: The method of any of aspects 1 through 2, further comprising: transmitting, to the network entity, a capability indication that indicates the UE comprises a laser; and receiving, from the network entity, control signaling configuring the UE to use the laser for uplink communication via the optical communication connection based at least in part on a distance between the UE and the network entity.

Aspect 4: The method of any of aspects 1 through 3, further comprising: transmitting, to the network entity, an indication of a capability of the UE to support full duplex communications via the optical communication connection, wherein the control signaling is received based at least in part on the indication.

Aspect 5: The method of any of aspects 1 through 4, wherein communicating the control signaling comprises: communicating one or more control messages to negotiate the first modulation scheme and the second modulation scheme.

Aspect 6: The method of aspect 5, wherein communicating the one or more control messages comprises: receiving, from the network entity, a first control message indicating the first modulation scheme.

Aspect 7: The method of any of aspects 5 through 6, wherein communicating the one or more control messages comprises: transmitting, to the network entity, a second control message indicating the second modulation scheme from a set of modulation schemes compatible with the first modulation scheme.

Aspect 8: The method of any of aspects 5 through 7, wherein communicating the one or more control messages to negotiate comprises: receiving, from the network entity, a second control message indicating the second modulation scheme.

Aspect 9: The method of any of aspects 1 through 8, wherein the downlink transmission is modulated via modulated retro reflection.

Aspect 10: The method of any of aspects 1 through 9, wherein the optical communication connection comprises a full duplex communication connection.

Aspect 11: The method of any of aspects 1 through 10, wherein the first modulation scheme is a first on-off-keying non-return-to-zero modulation at a first rate and the second modulation scheme is a second on-off-keying non-return-to-zero modulation at a second rate lower than the first rate.

Aspect 12: The method of any of aspects 1 through 10, wherein the first modulation scheme is a return-to-zero Manchester modulation at a first rate and the second modulation scheme is one of on-off-keying non-return-to-zero modulation at the first rate, a pulse amplitude modulation, or a quadrature amplitude modulation.

Aspect 13: The method of any of aspects 1 through 10, wherein the first modulation scheme is an amplitude modulation scheme and the second modulation scheme is a phase modulation scheme.

Aspect 14: The method of any of aspects 1 through 10, wherein for the first modulation scheme, each bit value is represented by a positive transmission power level.

Aspect 15: The method of any of aspects 1 through 10, wherein the first modulation scheme is an multi-level pulse amplitude modulation scheme.

Aspect 16: A method for wireless communications at a network entity, comprising: communicating, with a UE, control signaling indicating a first modulation scheme for downlink communication via an optical communication connection and a second modulation scheme for uplink communication via the optical communication connection; transmitting, to the UE via the optical communication connection, a downlink transmission modulated in accordance with the first modulation scheme; and receiving, from the UE via the optical communication connection, an uplink transmission modulated in accordance with the second modulation scheme.

Aspect 17: The method of aspect 16, further comprising: receiving, from the UE, an indication of a capability of the UE to support the optical communication connection via modulated retro reflection, wherein the control signaling is transmitted based at least in part on the indication.

Aspect 18: The method of any of aspects 16 through 17, further comprising: receiving, from the UE, a capability indication that indicates the UE comprises a laser; and transmitting, to the UE, control signaling configuring the UE to use the laser for uplink communication via the optical communication connection based at least in part on a distance between the UE and the network entity.

Aspect 19: The method of any of aspects 16 through 18, wherein the optical communication connection comprises a full duplex communication connection.

Aspect 20: The method of any of aspects 16 through 19, further comprising: receiving, from the UE, an indication of a capability of the UE to support full duplex communications via the optical communication connection, wherein the control signaling is transmitted based at least in part on the indication.

Aspect 21: The method of any of aspects 16 through 20, wherein communicating the control signaling comprises: communicating one or more control messages to negotiate the first modulation scheme and the second modulation scheme.

Aspect 22: The method of aspect 21, wherein communicating the one or more control messages to negotiate comprises: transmitting, to the UE, a first control message indicating the first modulation scheme.

Aspect 23: The method of any of aspects 21 through 22, wherein communicating the one or more control messages to negotiate comprises: transmitting, to the UE, a second control message indicating the second modulation scheme.

Aspect 24: The method of any of aspects 21 through 23, wherein communicating the one or more control messages to negotiate comprises: receiving, from the UE, a second control message indicating the second modulation scheme from a set of modulation schemes compatible with the first modulation scheme.

Aspect 25: The method of any of aspects 16 through 24, wherein the first modulation scheme is a first on-off-keying non-return-to-zero modulation at a first rate and the second modulation scheme is a second on-off-keying non-return-to-zero modulation at a second rate lower than the first rate.

Aspect 26: The method of any of aspects 16 through 24, wherein the first modulation scheme is a return-to-zero Manchester modulation at a first rate and the second modulation scheme is one of on-off-keying non-return-to-zero modulation at the first rate, a pule amplitude modulation, or a quadrature amplitude modulation.

Aspect 27: The method of any of aspects 16 through 24, wherein the first modulation scheme is an amplitude modulation scheme and the second modulation scheme is a phase modulation scheme.

Aspect 28: The method of any of aspects 16 through 24, wherein for the first modulation scheme, each bit value is represented by a positive transmission power level.

Aspect 29: The method of any of aspects 16 through 24, wherein the first modulation scheme is an multi-level pulse amplitude modulation scheme.

Aspect 30: An apparatus for wireless communications at a UE, comprising a processor; memory coupled with the processor; and instructions stored in the memory and executable by the processor to cause the apparatus to perform a method of any of aspects 1 through 15.

Aspect 31: An apparatus for wireless communications at a UE, comprising at least one means for performing a method of any of aspects 1 through 15.

Aspect 32: A non-transitory computer-readable medium storing code for wireless communications at a UE, the code comprising instructions executable by a processor to perform a method of any of aspects 1 through 15.

Aspect 33: An apparatus for wireless communications at a network entity, comprising a processor; memory coupled with the processor; and instructions stored in the memory and executable by the processor to cause the apparatus to perform a method of any of aspects 16 through 29.

Aspect 34: An apparatus for wireless communications at a network entity, comprising at least one means for performing a method of any of aspects 16 through 29.

Aspect 35: A non-transitory computer-readable medium storing code for wireless communications at a network entity, the code comprising instructions executable by a processor to perform a method of any of aspects 16 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   one or more processors;
   one or more memories coupled with the one or more processors; and
   instructions stored in the one or more memories and executable by the one or more processors to cause the apparatus to:
   communicate, with a network entity, control signaling indicating a first modulation scheme for downlink communication via an optical communication connection and a second modulation scheme for uplink communication via the optical communication connection;
   receive, from the network entity via the optical communication connection, a downlink optical beam transmission modulated in accordance with the first modulation scheme; and
   transmit, to the network entity via the optical communication connection, an uplink optical beam transmission by modulating a reflection of the downlink optical beam transmission in accordance with the second modulation scheme, wherein the second modulation scheme is compatible with the first modulation scheme for double modulation.

2. The apparatus of claim 1, wherein the instructions are further executable by the one or more processors to cause the apparatus to:

transmit, to the network entity, an indication of a capability of the UE to support the optical communication connection via modulated retro reflection, wherein the second modulation scheme is based at least in part on the indication.

3. The apparatus of claim 1, wherein the instructions are further executable by the one or more processors to cause the apparatus to:

transmit, to the network entity, a capability indication that indicates the UE comprises a laser; and receive, from the network entity, control signaling configuring the UE to use the laser for uplink communication via the optical communication connection, wherein use of the laser is based at least in part on a distance between the UE and the network entity.

4. The apparatus of claim 1, wherein the instructions are further executable by the one or more processors to cause the apparatus to:

transmit, to the network entity, an indication of a capability of the UE to support full duplex communications via the optical communication connection, wherein the second modulation scheme is based at least in part on the indication.

5. The apparatus of claim 1, wherein the instructions to communicate the control signaling are executable by the one or more processors to cause the apparatus to:

communicate one or more control messages to negotiate the first modulation scheme and the second modulation scheme.

6. The apparatus of claim 5, wherein the instructions to communicate the one or more control messages are executable by the one or more processors to cause the apparatus to:

receive, from the network entity, a first control message indicating the first modulation scheme.

7. The apparatus of claim 5, wherein the instructions to communicate the one or more control messages are executable by the one or more processors to cause the apparatus to:

transmit, to the network entity, a second control message indicating the second modulation scheme from a set of modulation schemes compatible with the first modulation scheme.

8. The apparatus of claim 5, wherein the instructions to communicate the one or more control messages to negotiate are executable by the one or more processors to cause the apparatus to:

receive, from the network entity, a second control message indicating the second modulation scheme.

9. The apparatus of claim 1, wherein:

the downlink optical beam transmission is modulated via modulated retro reflection.

10. The apparatus of claim 1, wherein:

the optical communication connection comprises a full duplex communication connection.

11. The apparatus of claim 1, wherein:

the first modulation scheme is a first on-off-keying non-return-to-zero modulation at a first rate and the second modulation scheme is a second on-off-keying non-return-to-zero modulation at a second rate lower than the first rate.

12. The apparatus of claim 1, wherein:

the first modulation scheme is a return-to-zero Manchester modulation at a first rate and the second modulation scheme is one of on-off-keying non-return-to-zero modulation at the first rate, a pulse amplitude modulation, or a quadrature amplitude modulation.

13. The apparatus of claim 1, wherein:

the first modulation scheme is an amplitude modulation scheme and the second modulation scheme is a phase modulation scheme.

14. The apparatus of claim 1, wherein:

for the first modulation scheme, each bit value is represented by a positive transmission power level.

15. The apparatus of claim 1, wherein:

the first modulation scheme is an multi-level pulse amplitude modulation scheme.

16. An apparatus for wireless communications at a network entity, comprising:

one or more processors;

one or more memories coupled with the one or more processors; and instructions stored in the one or more memories and executable by the one or more processors to cause the apparatus to:

communicate, with a user equipment (UE), control signaling indicating a first modulation scheme for downlink communication via an optical communication connection and a second modulation scheme for uplink communication via the optical communication connection;

transmit, to the UE via the optical communication connection, a downlink optical beam transmission modulated in accordance with the first modulation scheme; and receive, from the UE via the optical communication connection, an uplink optical beam transmission, wherein the uplink optical beam transmission comprises a reflection of the downlink optical beam transmission modulated in accordance with the second modulation scheme, wherein the second modulation scheme is compatible with the first modulation scheme for double modulation.

17. The apparatus of claim 16, wherein the instructions are further executable by the one or more processors to cause the apparatus to:

receive, from the UE, an indication of a capability of the UE to support the optical communication connection via modulated retro reflection, wherein the second modulation scheme is based at least in part on the indication.

18. The apparatus of claim 16, wherein the instructions are further executable by the one or more processors to cause the apparatus to:

receive, from the UE, a capability indication that indicates the UE comprises a laser; and transmit, to the UE, control signaling configuring the UE to use the laser for uplink communication via the optical communication connection, wherein use of the laser is based at least in part on a distance between the UE and the network entity.

19. The apparatus of claim 16, wherein the instructions are further executable by the one or more processors to cause the apparatus to:

receive, from the UE, an indication of a capability of the UE to support full duplex communications via the optical communication connection, wherein the second modulation scheme is based at least in part on the indication.

20. The apparatus of claim 16, wherein the instructions to communicate the control signaling are executable by the one or more processors to cause the apparatus to:
communicate one or more control messages to negotiate the first modulation scheme and the second modulation scheme.

21. The apparatus of claim 20, wherein the instructions to communicate the one or more control messages to negotiate are executable by the one or more processors to cause the apparatus to:
transmit, to the UE, a first control message indicating the first modulation scheme.

22. The apparatus of claim 20, wherein the instructions to communicate the one or more control messages to negotiate are executable by the one or more processors to cause the apparatus to:
transmit, to the UE, a second control message indicating the second modulation scheme.

23. The apparatus of claim 20, wherein the instructions to communicate the one or more control messages to negotiate are executable by the one or more processors to cause the apparatus to:
receive, from the UE, a second control message indicating the second modulation scheme from a set of modulation schemes compatible with the first modulation scheme.

24. The apparatus of claim 16, wherein:
the first modulation scheme is a first on-off-keying non-return-to-zero modulation at a first rate and the second modulation scheme is a second on-off-keying non-return-to-zero modulation at a second rate lower than the first rate.

25. The apparatus of claim 16, wherein:
the first modulation scheme is a return-to-zero Manchester modulation at a first rate and the second modulation scheme is one of on-off-keying non-return-to-zero modulation at the first rate, a pulse amplitude modulation, or a quadrature amplitude modulation.

26. The apparatus of claim 16, wherein:
the first modulation scheme is an amplitude modulation scheme and the second modulation scheme is a phase modulation scheme.

27. The apparatus of claim 16, wherein:
for the first modulation scheme, each bit value is represented by a positive transmission power level.

28. The apparatus of claim 16, wherein:
the first modulation scheme is an multi-level pulse amplitude modulation scheme.

29. A method for wireless communications at a user equipment (UE), comprising:
communicating, with a network entity, control signaling indicating a first modulation scheme for downlink communication via an optical communication connection and a second modulation scheme for uplink communication via the optical communication connection;
receiving, from the network entity via the optical communication connection, a downlink optical beam transmission modulated in accordance with the first modulation scheme; and
transmitting, to the network entity via the optical communication connection, an uplink optical beam transmission by modulating a reflection of the downlink optical beam transmission in accordance with the second modulation scheme, wherein the second modulation scheme is compatible with the first modulation scheme for double modulation.

30. A method for wireless communications at a network entity, comprising:
communicating, with a user equipment (UE), control signaling indicating a first modulation scheme for downlink communication via an optical communication connection and a second modulation scheme for uplink communication via the optical communication connection;
transmitting, to the UE via the optical communication connection, a downlink optical beam transmission modulated in accordance with the first modulation scheme; and
receiving, from the UE via the optical communication connection, an uplink optical beam transmission, wherein the uplink optical beam transmission comprises a reflection of the downlink optical beam transmission modulated in accordance with the second modulation scheme, wherein the second modulation scheme is compatible with the first modulation scheme for double modulation.

* * * * *